(12) United States Patent
Imanishi et al.

(10) Patent No.: US 11,141,827 B2
(45) Date of Patent: Oct. 12, 2021

(54) WORKPIECE REPLACING APPARATUS AND MACHINE TOOL

(71) Applicant: JTEKT CORPORATION, Osaka (JP)

(72) Inventors: Kozo Imanishi, Anjo (JP); Yoshio Ootsuka, Ichinomiya (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/183,997

(22) Filed: Nov. 8, 2018

(65) Prior Publication Data
US 2019/0143466 A1 May 16, 2019

(30) Foreign Application Priority Data
Nov. 14, 2017 (JP) .............................. JP2017-218790

(51) Int. Cl.
*B23Q 7/04* (2006.01)
*B23Q 11/08* (2006.01)
(Continued)

(52) U.S. Cl.
CPC ................ *B23Q 7/04* (2013.01); *B23F 23/04* (2013.01); *B23Q 11/0825* (2013.01);
(Continued)

(58) Field of Classification Search
CPC ... Y10T 409/30392; Y10T 409/100795; Y10T 29/5196; Y10T 29/5124;
(Continued)

(56) References Cited

U.S. PATENT DOCUMENTS 5,265,497 A * 11/1993 Curless ..................... F16P 3/08
409/134
5,302,061 A * 4/1994 Terawaki ................. B23Q 7/04
409/134
(Continued)

FOREIGN PATENT DOCUMENTS

CH           654237 A5 *  2/1986
DE    102005058347 A1 *  6/2007
(Continued)

OTHER PUBLICATIONS

Machine Translation of JP 2000-084773-A, which JP '773 was published Mar. 2000.*

(Continued)

*Primary Examiner* — Erica E Cadugan
(74) *Attorney, Agent, or Firm* — Oblon, McClelland, Maier & Neustadt, L.L.P.

(57) ABSTRACT

A workpiece replacing apparatus delivers a pre-machined workpiece into an intra-machine space inside a machine tool from an extra-machine space outside the machine tool, and delivers a workpiece machined by the machine tool to the extra-machine space from the intra-machine space. The workpiece replacing apparatus includes a secured cover, an arm device, and a movable cover. The secured cover is secured to a securing member of the machine tool. The secured cover defines a partition between the intra-machine space and the extra-machine space. The secured cover is provided with an opening. The arm device delivers the workpieces between the intra-machine space and the extra-machine space through the opening. The movable cover is integral with the arm device or in engagement with the arm device such that the movable cover is operable in conjunction with operation of the arm device. The movable cover
(Continued)

closes the opening, with the arm device located in the extra-machine space.

6 Claims, 21 Drawing Sheets

(51) Int. Cl.
 *B23F 23/04* (2006.01)
 *B23Q 7/03* (2006.01)
(52) U.S. Cl.
 CPC ............ *B23Q 11/0891* (2013.01); *B23Q 7/03* (2013.01); *Y10T 409/100954* (2015.01); *Y10T 409/30392* (2015.01); *Y10T 409/30532* (2015.01)
(58) Field of Classification Search
 CPC ....... B23Q 11/08–11/0891; B23Q 7/04; B23Q 7/1494; B23Q 2707/04; B23F 23/02; B23F 23/04
 USPC ........................... 409/134, 6–7; 29/33 P, 563
 See application file for complete search history.

(56) References Cited

U.S. PATENT DOCUMENTS

| | | | | |
|---|---|---|---|---|
| 5,669,751 A | * | 9/1997 | Hoffman | .................. B23Q 7/04 |
| | | | | 409/134 |
| 7,108,647 B2 | * | 9/2006 | Nakazawa | ............... B23Q 1/66 |
| | | | | 409/134 |
| 2014/0304958 A1 | * | 10/2014 | Maerzinger | ........ B23Q 11/0891 |
| | | | | 409/134 |
| 2017/0284146 A1 | | 10/2017 | Maki | |
| 2017/0312873 A1 | * | 11/2017 | Itoh | ......................... B23Q 7/04 |

FOREIGN PATENT DOCUMENTS

| | | | |
|---|---|---|---|
| JP | 2000-084773 | | 3/2000 |
| JP | 2000-343372 | | 12/2000 |
| JP | 2014-054676 A | * | 3/2014 |
| JP | 2017-185584 | | 10/2017 |
| WO | WO-2016/056344 A1 | * | 4/2016 |

OTHER PUBLICATIONS

Japanese Office Action dated Jun. 8, 2021 in Japanese Patent Application No. 2017-218790 w/English translation, 12 pages.

* cited by examiner

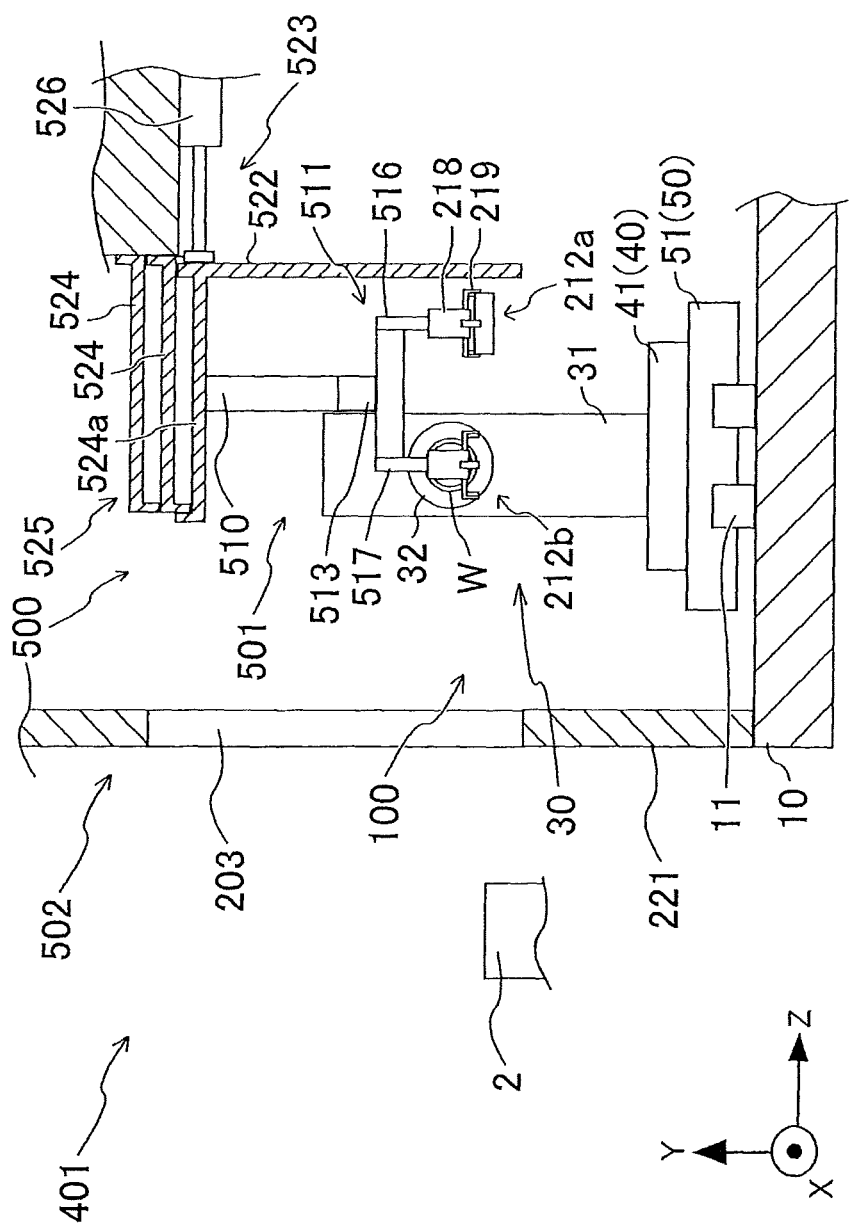

WORKPIECE REPLACING APPARATUS AND MACHINE TOOL

INCORPORATION BY REFERENCE

The disclosure of Japanese Patent Application No. 2017-218790 filed on Nov. 14, 2017, including the specification, drawings and abstract, is incorporated herein by reference in its entirety.

BACKGROUND OF THE INVENTION

1. Field of the Invention

The invention relates to workpiece replacing apparatuses and machine tools.

2. Description of the Related Art

A machine tool disclosed in Japanese Patent Application Publication No. 2017-185584 (JP 2017-185584 A) includes: a door to close an opening of a cover surrounding the machine tool; and an electric motor to open and close the door. A technique disclosed in JP 2017-185584 A involves controlling the electric motor so as to reduce the time required for opening and closing the door during replacement of a workpiece, thus reducing cycle time.

The technique disclosed in JP 2017-185584 A, however, requires synchronously controlling the electric motor and a workpiece replacing apparatus. This may unfortunately cause the door and the workpiece to interfere with each other in the event of some sort of error.

SUMMARY OF THE INVENTION

An object of the invention is to provide workpiece replacing apparatuses and machine tools each capable of preventing a movable cover and a workpiece from interfering with each other, while reducing the time required for workpiece replacement.

An aspect of the invention provides a workpiece replacing apparatus to deliver a pre-machined workpiece into an intra-machine space inside a machine tool from an extra-machine space outside the machine tool and to deliver the workpiece machined by the machine tool to the extra-machine space from the intra-machine space. The workpiece replacing apparatus includes a secured cover, an arm device, and a movable cover. The secured cover is secured to a securing member of the machine tool. The secured cover defines a partition between the intra-machine space and the extra-machine space. The secured cover is provided with a cover opening. The arm device delivers the workpiece between the intra-machine space and the extra-machine space through the cover opening. The movable cover is integral with the arm device or in engagement with the arm device such that the movable cover is operable in conjunction with operation of the arm device. The movable cover closes the cover opening, with the arm device located in the extra-machine space.

The movable cover of the workpiece replacing apparatus according to the above aspect is integral with the arm device or in engagement with the arm device such that the movable cover is operable in conjunction with operation of the arm device. The workpiece replacing apparatus is thus able to open and close the cover opening with the movable cover concurrently with delivery of the workpiece by the arm device. Accordingly, the time required for workpiece replacement carried out by the workpiece replacing apparatus is shorter than when delivery of the workpiece by the arm device starts after completion of opening and closing of the cover opening with the movable cover.

Because the movable cover is integral with the arm device or in engagement with the arm device such that the movable cover is operable in conjunction with operation of the arm device, the distance between the arm device and the movable cover is maintained constant. The workpiece replacing apparatus is thus able to prevent the workpiece delivered by the arm device and the movable cover from interfering with each other.

Another aspect of the invention provides a machine tool including the workpiece replacing apparatus according to the above aspect, a workpiece retainer, a tool retainer, and a transporter. The workpiece retainer is disposed inward of the secured cover. The workpiece retainer retains the workpiece during machining of the workpiece. The tool retainer is disposed inward of the secured cover. The tool retainer retains a machining tool for use in machining of the workpiece retained by the workpiece retainer. The transporter moves the workpiece retainer relative to the tool retainer for machining of the workpiece and moves the workpiece retainer relative to the arm device for delivery of the workpiece between the workpiece retainer and the arm device.

The machine tool according to the above aspect does not require, in addition to the transporter to be used for machining of the workpiece, any other device (such as a driver) to move the workpiece retainer relative to the arm device for delivery of the workpiece between the workpiece retainer and the arm device. Consequently, the machine tool has a simplified structure.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 13B is a schematic diagram of the machine tool according to the second embodiment of the invention, illustrating the workpiece replacing apparatus whose arm device has moved to an intra-machine space from the position illustrated in FIG. 13A.

DETAILED DESCRIPTION OF EMBODIMENTS

Workpiece replacing apparatuses and machine tools according to embodiments of the invention will be described below with reference to the drawings. First, a machine tool 1 according to a first embodiment of the invention will be briefly described with reference to FIGS. 1 and 2.

Figure 1:
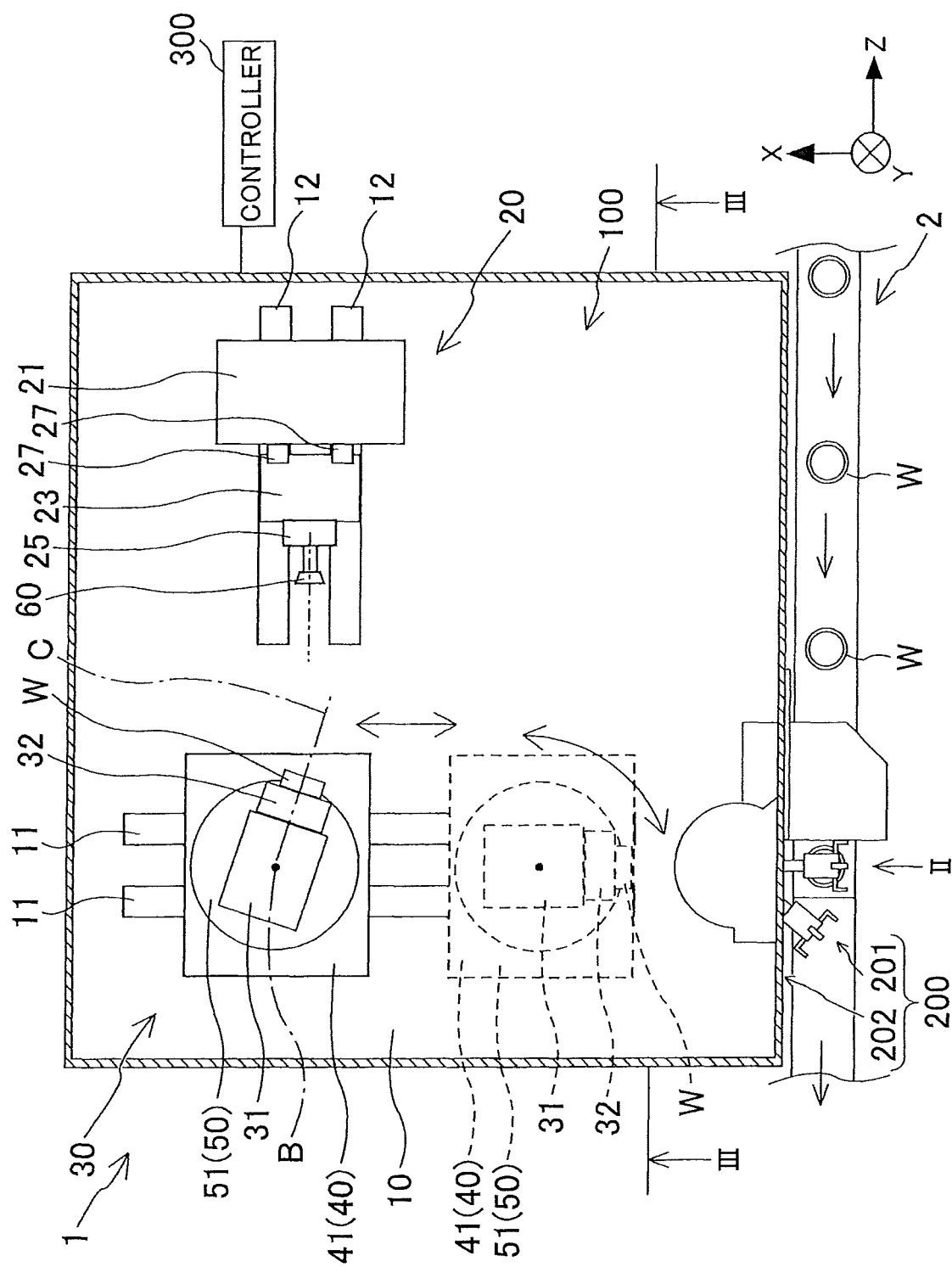
FIG. 1 is a plan view of a machine tool according to a first embodiment of the invention.

As illustrated in FIG. 1, the machine tool 1 includes: a machining apparatus 100 to machine a workpiece W; an arm device 201 to deliver the workpiece W; and a box-shaped housing 202 covering the machining apparatus 100.

A conveyor 2 is disposed adjacent to the machine tool 1. The conveyor 2 conveys the workpiece W that is to be machined. The workpiece W that is to be machined will hereinafter be referred to as a "pre-machined workpiece W". The conveyor 2 delivers the pre-machined workpiece W to a delivery position where the pre-machined workpiece W is to be passed to the machine tool 1. The arm device 201 receives the pre-machined workpiece W delivered to the delivery position and passes the pre-machined workpiece W to the machining apparatus 100. The machining apparatus 100 machines the pre-machined workpiece W received.

After the workpiece W has been machined by the machining apparatus 100, the arm device 201 receives, from the machining apparatus 100, the workpiece W that has been machined. The workpiece W that has been machined by the machining apparatus 100 will hereinafter be referred to as a "machined workpiece W". The arm device 201 then passes the machined workpiece W to the conveyor 2 at the delivery position. The conveyor 2 delivers the machined workpiece W out of the delivery position and delivers a new pre-machined workpiece W to the delivery position.

Figure 2:
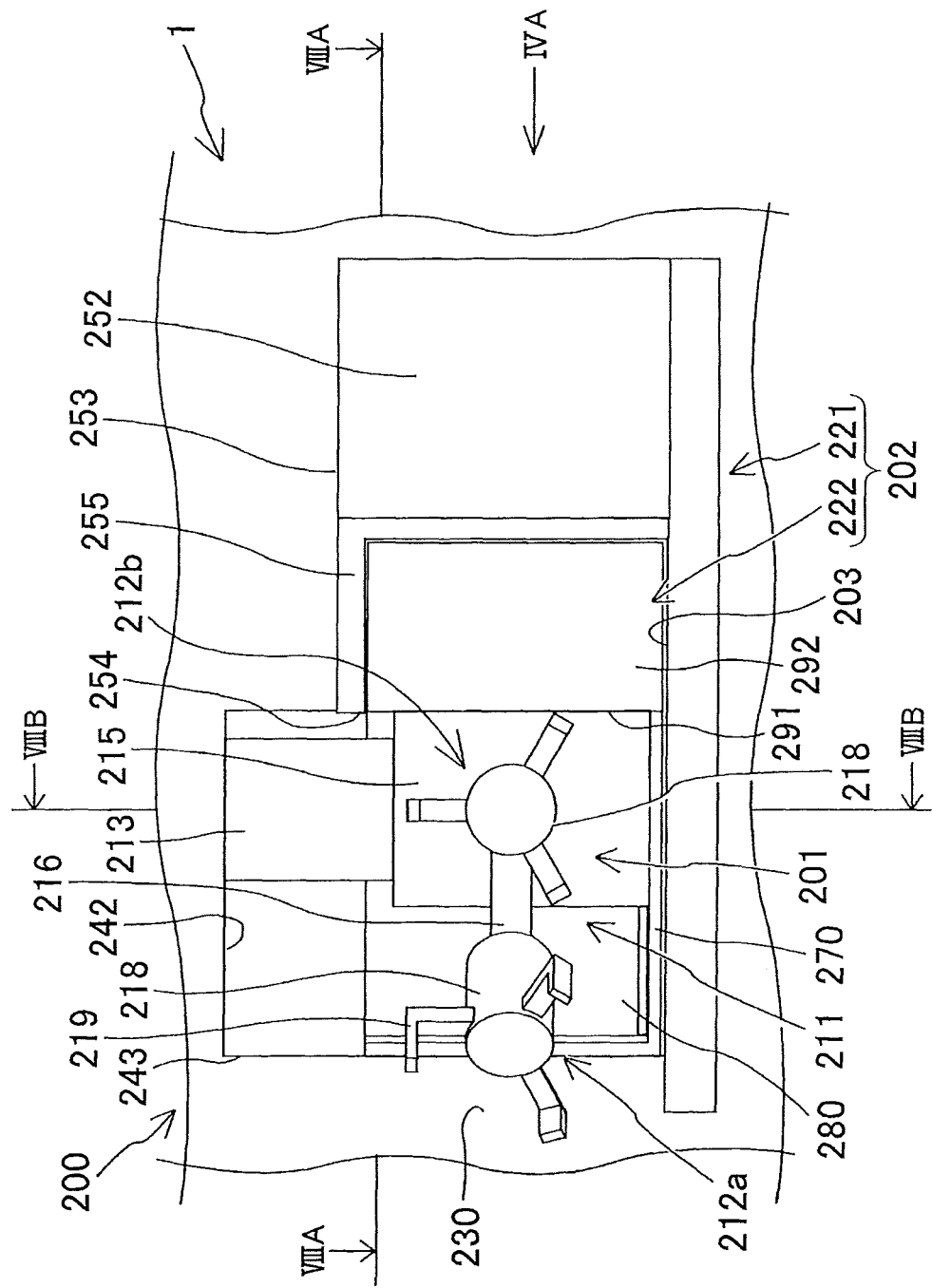
FIG. 2 is a front view of a workpiece replacing apparatus viewed in the direction II in FIG. 1.

As illustrated in FIG. 2, the housing 202 includes: a secured cover 221 secured to the machining apparatus 100; and a movable cover 222 movable relative to the secured cover 221. The secured cover 221 defines a partition between an intra-machine space and an extra-machine space. As used herein, the term "intra-machine space" refers to a space located inside the machine tool 1, and the term "extra-machine space" refers to a space located outside the machine tool 1. The secured cover 221 prevents scattering of chips and/or other substances resulting from machining by the machining apparatus 100.

The secured cover 221 is provided with an opening 203. The arm device 201 passes through the opening 203 in delivering the workpiece W into and out of the machine tool 1 (i.e., in delivering the workpiece W between the intra-machine space and the extra-machine space). The movable cover 222 closes the opening 203 during machining by the machining apparatus 100. The movable cover 222 opens the opening 203 during delivery of the workpiece W by the arm device 201. Although not illustrated, an outer cover is disposed around the opening 203 for the sake of safety.

The movable cover 222 is operable in conjunction with operation of the arm device 201. The machine tool 1 thus concurrently performs delivery of the workpiece W and opening and closing of the opening 203. The arm device 201 and the housing 202 are integral with each other and function as a workpiece replacing apparatus 200. The machine tool 1 includes the workpiece replacing apparatus 200 and is thus able to reduce cycle time.

Components of the machine tool 1 will be described below. As illustrated in FIG. 1, the machine tool 1 includes the machining apparatus 100, the workpiece replacing apparatus 200, and a controller 300.

Figure 3:
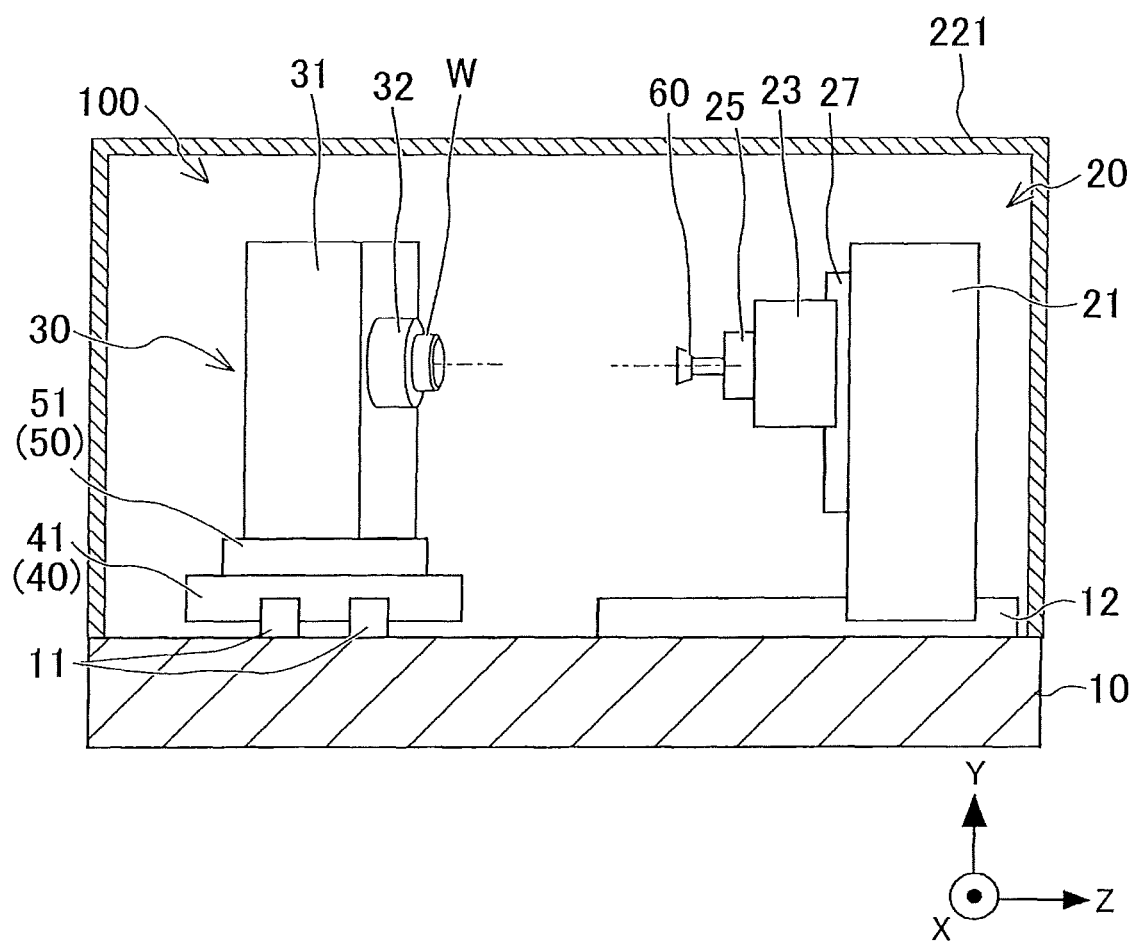
FIG. 3 is a cross-sectional view of the machine tool taken along line in FIG. 1.

As illustrated in FIGS. 1 and 3, the machining apparatus 100 is a machining center including five drive axes. Three of the five drive axes are straight drive axes (i.e., X, Y, and Z axes) perpendicular or substantially perpendicular to each other. Two of the five drive axes are rotation axes (i.e., B and C axes). The machining apparatus 100 includes a bed 10, a tool retainer 20, a workpiece retainer 30, a transporter 40, and a workpiece turner 50.

The bed 10 has a substantially rectangular shape in a plan view. The upper surface of the bed 10 is provided with a pair of X-axis guide rails 11 extending in an X-axis direction, and a pair of Z-axis guide rails 12 extending in a Z-axis direction. The tool retainer 20 includes a column 21, a Z-axis driver 22 (see FIG. 9), a saddle 23, a Y-axis driver 24 (see FIG. 9), a spindle 25, and a spindle motor 26 (see FIG. 9). In FIGS. 1 and 3, the Z-axis driver 22, the Y-axis driver 24, or the spindle motor 26 is not illustrated.

The column 21 is movable in the Z-axis direction along the Z-axis guide rails 12. The Z-axis driver 22 is a screw feeder to move the column 21 relative to the bed 10 in the Z-axis direction. A lateral surface of the column 21 is provided with a pair of Y-axis guide rails 27 extending in a Y-axis direction. The saddle 23 is movable relative to the column 21 in the Y-axis direction along the Y-axis guide rails 27. The Y-axis driver 24 is a screw feeder to move the saddle 23 in the Y-axis direction.

The spindle 25 is supported by the saddle 23 such that the spindle 25 is rotatable relative to the saddle 23 around an axis parallel or substantially parallel to the Z-axis direction. A gear cutter 60 is detachably attached to an end of the spindle 25. The gear cutter 60 is used to machine the workpiece W. The gear cutter 60 is retained by the tool retainer 20 such that the gear cutter 60 is rotatable relative to the tool retainer 20 around an axis parallel or substantially parallel to the Z axis. The gear cutter 60 moves in the Z-axis direction in accordance with the movement of the column 21. The gear cutter 60 moves in the Y-axis direction in accordance with the movement of the saddle 23. The spindle motor 26 provides a driving force to rotate the spindle 25. The spindle motor 26 is housed in the saddle 23.

Figure 9:
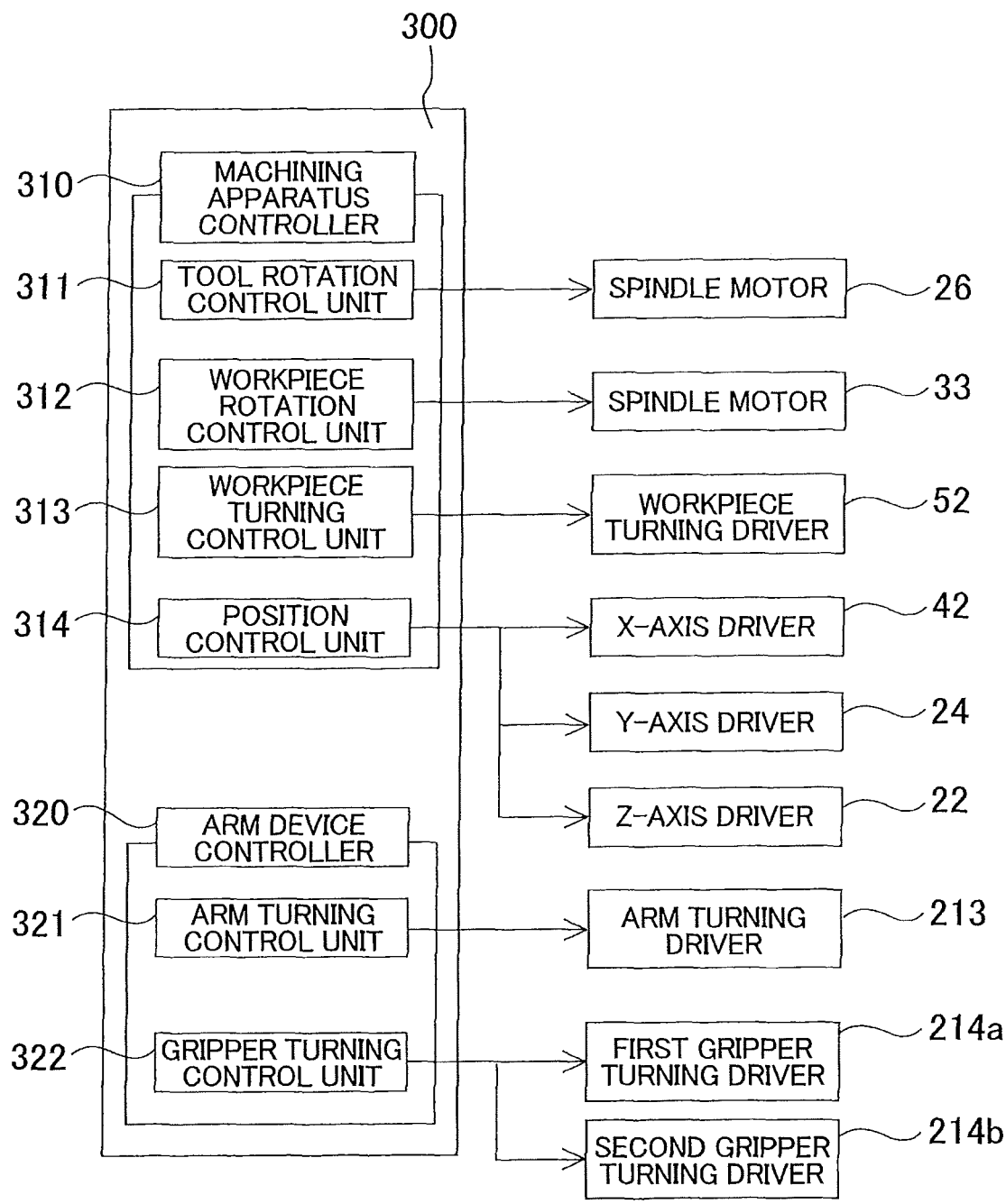
FIG. 9 is a block diagram of a controller.

The workpiece retainer 30 includes a spindle stock 31, a spindle 32, and a spindle motor 33 (see FIG. 9). The spindle stock 31 supports the spindle 32 such that the spindle 32 is rotatable around the C axis perpendicular or substantially perpendicular to the Y-axis direction. The spindle 32 retains the workpiece W such that the workpiece W is detachable from the spindle 32. The spindle motor 33 provides a driving force to rotate the spindle 32. The spindle motor 33 is housed in the spindle stock 31.

The transporter 40 includes a transportation table 41 and an X-axis driver 42 (see FIG. 9). The transportation table 41 is movable in the X-axis direction along the X-axis guide rails 11. The X-axis driver 42 is a screw feeder to move the transportation table 41 relative to the bed 10 in the X-axis direction.

The workpiece turner 50 includes a rotation table 51 and a workpiece turning driver 52 (see FIG. 9). The rotation table 51 is disposed on the transportation table 41 such that the rotation table 51 is rotatable relative to the transportation table 41 around the B axis parallel or substantially parallel to the Y axis. The spindle stock 31 is disposed on the rotation table 51. The workpiece retainer 30 is disposed on the transportation table 41 such that the workpiece retainer 30 is rotatable relative to the transportation table 41 around the B axis. The workpiece turning driver 52 is a motor that provides a driving force to rotate the rotation table 51. The workpiece turning driver 52 is housed in the transportation table 41.

In effecting gear cutting, the machining apparatus 100 turns the workpiece retainer 30 around the B axis, so that the workpiece retainer 30 retains the workpiece W, with the rotation axis of the workpiece W inclined with respect to the rotation axis of the gear cutter 60. The machining apparatus 100 rotates the gear cutter 60 and the workpiece W synchronously and feeds the gear cutter 60 in the direction of the rotation axis of the workpiece W so as to cut the workpiece W.

The secured cover 221 is secured to the bed 10. The tool retainer 20, the workpiece retainer 30, the transporter 40, and the workpiece turner 50 are disposed in the intra-machine space (i.e., inward of the secured cover 221). The machining apparatus 100 receives the pre-machined workpiece W, delivered into the intra-machine space from the extra-machine space by the arm device 201, so as to machine the workpiece W. The machining apparatus 100 passes the machined workpiece W to the arm device 201 so as to deliver the machined workpiece W from the intra-machine space to the extra-machine space.

In delivering the workpiece W to the arm device 201, the transporter 40 transports the workpiece retainer 30 to a delivery position where the workpiece retainer 30 faces the arm device 201 as indicated by the dashed lines in FIG. 1. After receiving the workpiece W from the arm device 201, the transporter 40 transports the workpiece retainer 30 to a machining position where the workpiece retainer 30 faces the tool retainer 20. This means that delivery of the workpiece W between the workpiece retainer 30 and the arm device 201 involves reciprocating the workpiece retainer 30 between the machining position and the delivery position.

Passing the workpiece W to the arm device 201 at the delivery position involves turning the workpiece retainer 30 by the workpiece turner 50 such that the spindle 32 faces the arm device 201. The machining apparatus 100 is thus able to place the workpiece W, retained by the spindle 32, at a position where the workpiece W is to be received by the arm device 201. Machining the workpiece W, received from the arm device 201, at the machining position involves turning the workpiece retainer 30 by the workpiece turner 50 such that the spindle 32 faces the tool retainer 20. The machining apparatus 100 is thus able to place the workpiece W at a position where the workpiece W can be machined by the gear cutter 60.

The transporter 40 and the workpiece turner 50 have not only the function of moving the workpiece retainer 30 relative to the tool retainer 20 for machining of the workpiece W but also the function of moving the workpiece retainer 30 relative to the arm device 201 for delivery of the workpiece W. In other words, the machine tool 1 does not require, in addition to the transporter 40 to be used for machining of the workpiece W, any other device (such as a driver) to move the workpiece retainer 30 relative to the arm device 201 for delivery of the workpiece W between the workpiece retainer 30 and the arm device 201. The machine tool 1 thus has a simplified structure.

The structure of the arm device 201 will be described below. As illustrated in FIG. 2, the workpiece replacing apparatus 200 includes the arm device 201 and the housing 202. The arm device 201 includes an arm body 211, a first gripper 212a, a second gripper 212b, an arm turning driver 213, a first gripper turning driver 214a (see FIG. 9), and a second gripper turning driver 214b (see FIG. 9).

The arm body 211 includes an arm base 215, a first arm 216, and a second arm 217. The arm base 215 is disposed on the secured cover 221 of the housing 202 such that the arm base 215 is turnable relative to the secured cover 221 around a pivot parallel or substantially parallel to the Y axis. The first arm 216 and the second arm 217 extend radially outward relative to a turning center P of the arm base 215 in different directions. In the present embodiment, the angle formed between the first arm 216 and the second arm 217 with respect to the turning center P of the arm base 215 is set at 40 degrees. Alternatively, the angle formed between the first arm 216 and the second arm 217 may be set at 35 degrees. The angle formed between the first arm 216 and the second arm 217 with respect to the turning center P of the arm base 215 may be set at an optimal angle in accordance with, for example, the dimensions of the workpiece W and/or the time during which the arm body 211 turns (i.e., the time required for replacement of the target workpiece W).

The machine tool 1 uses the first arm 216 in receiving, in the extra-machine space outside the machine tool 1, the pre-machined workpiece W delivered by the conveyor 2 and passing the pre-machined workpiece W to the workpiece retainer 30 in the intra-machine space inside the machine tool 1. The machine tool 1 uses the second arm 217 in receiving, in the intra-machine space, the machined workpiece W from the workpiece retainer 30 and passing the machined workpiece W to the conveyor 2 in the extra-machine space. The first arm 216 is provided with the first gripper 212a. The second arm 217 is provided with the second gripper 212b.

Figure 4A:
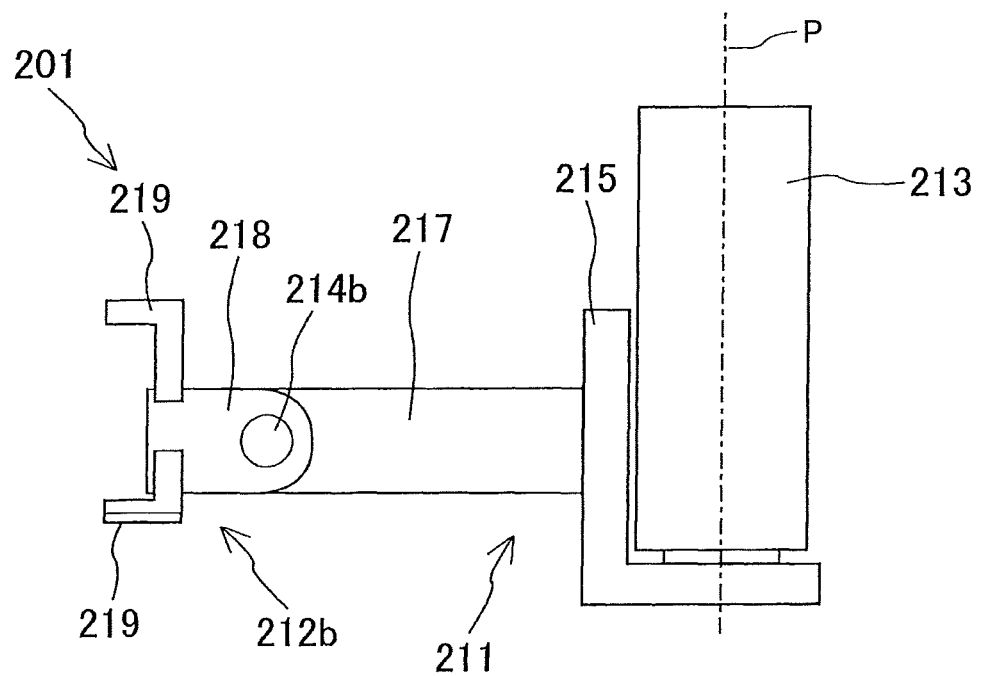
FIG. 4A is a side view of an arm device viewed in the direction IVA in FIG. 2, with a first arm and a first gripper omitted therefrom.

As illustrated in FIG. 4A, the second gripper 212b includes a gripper body 218 and three gripping lugs 219. The gripper body 218 has a cylindrical shape. The gripper body 218 is disposed on the second arm 217 such that the gripper body 218 is swingable around an axis parallel or substantially parallel to a tangent to a circle whose center is located at the turning center P of the arm base 215. The three gripping lugs 219 each extend radially outward from the gripper body 218. The gripping lugs 219 are bent and thus able to grip, from outside, the workpiece W having an annular shape. The gripping lugs 219 may grip the workpiece W from inside.

Figure 4B:
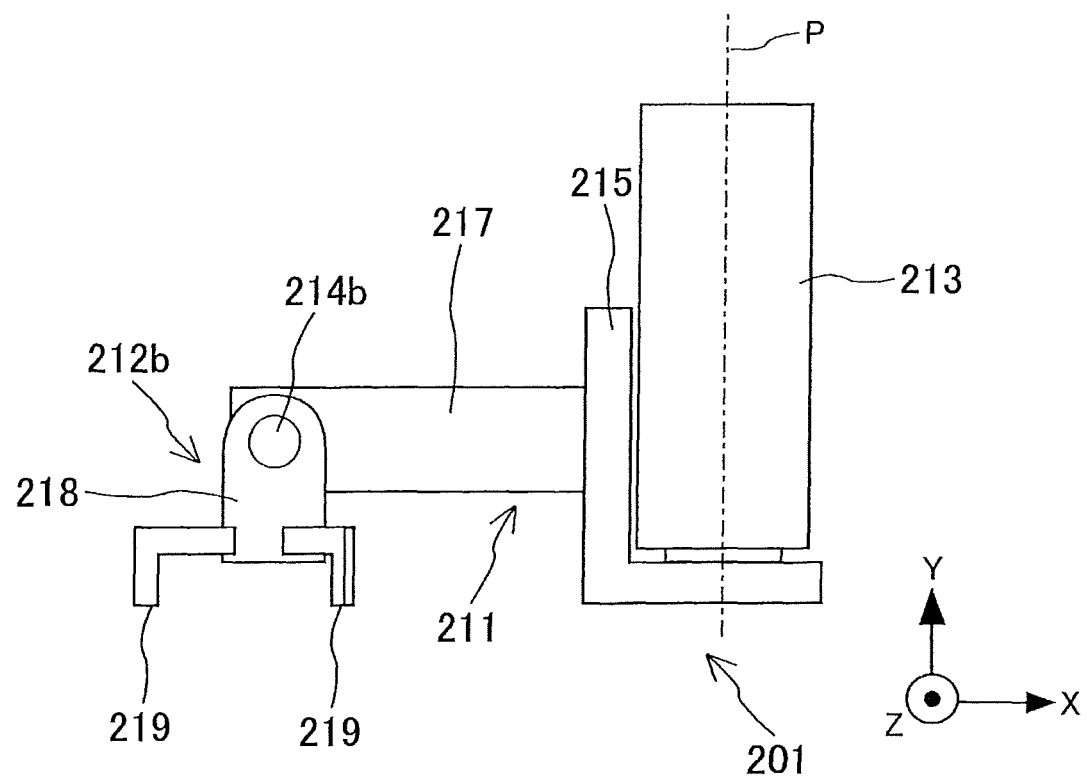
FIG. 4B is a side view of the arm device whose second gripper is turned from the position illustrated in FIG. 4A, such that gripping lugs face downward, with the first arm and the first gripper omitted therefrom.

As illustrated in FIG. 4B, the arm device 201 allows the second gripper 212b to swing so as to change the orientation of the three gripping lugs 219 disposed on the gripper body 218. The second gripper 212b is thus able to, after receiving the workpiece W from the workpiece retainer 30, change the orientation of the workpiece W so as to pass the workpiece W to the conveyor 2. The first gripper 212a is able to, after receiving the workpiece W from the conveyor 2, change the orientation of the workpiece W so as to pass the workpiece W to the workpiece retainer 30. The first gripper 212a is identical in structure to the second gripper 212b, and thus description of the structure of the first gripper 212a will be omitted.

The arm turning driver 213 is a motor with reduction gears that provides a driving force to turn the arm body 211. The arm turning driver 213 is secured to the secured cover 221 (see FIG. 2). The first gripper turning driver 214a is a motor that provides a driving force to swing the first gripper 212a. The second gripper turning driver 214b is a motor that provides a driving force to swing the second gripper 212b.

As illustrated in FIG. 2, the housing 202 includes the secured cover 221 and the movable cover 222. The secured cover 221 has a box shape. The secured cover 221 is secured to the bed 10 (see FIG. 3) that functions as a securing member. The secured cover 221 covers an entirety of the machining apparatus 100 so as to define a partition between the intra-machine space located inside the machine tool 1 and the extra-machine space located outside the machine tool 1. The secured cover 221 thus prevents chips and/or other substances produced by machining from scattering to the extra-machine space.

Figure 5:
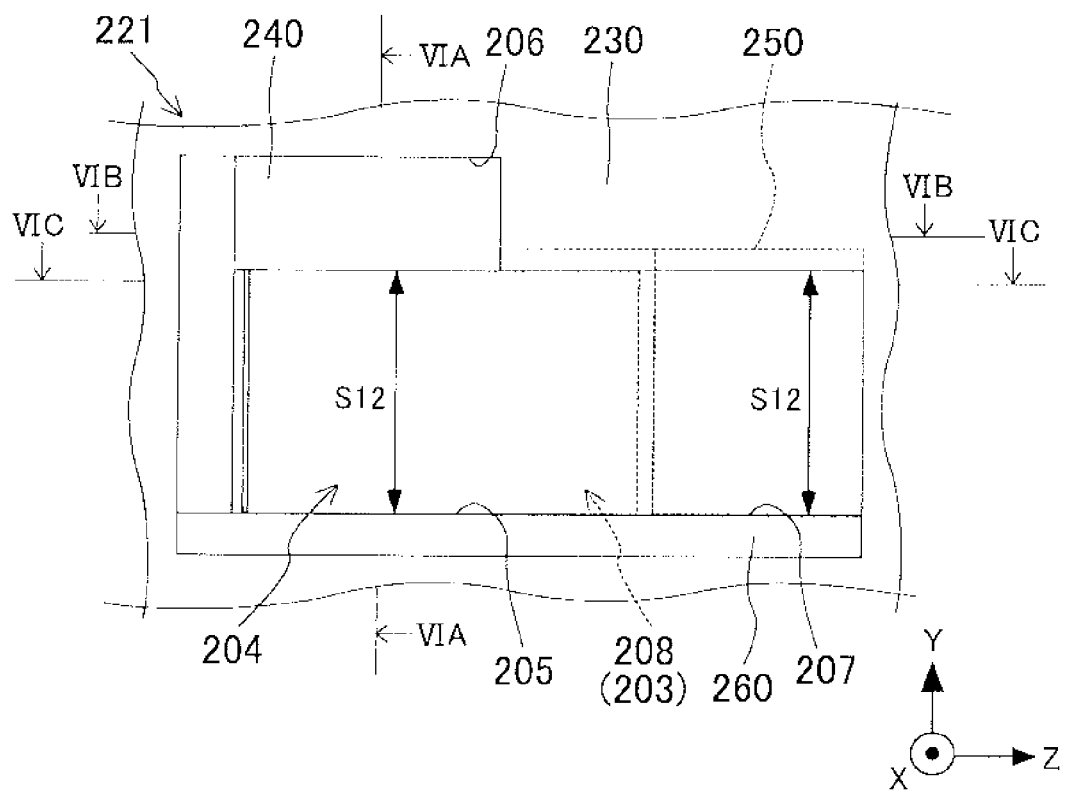
FIG. 5 is an enlarged front view of a portion of a secured cover provided with an opening and associated with FIG. 2.

As illustrated in FIG. 5, the secured cover 221 includes a secured cover body wall 230, a recessed cover 240, a projecting cover 250, and a bottom plate 260. The secured cover body wall 230 is a flat plate portion of the secured cover 221 covering the four sides of the bed 10. The secured cover body wall 230 defines one of the lateral surfaces of the secured cover 221 that faces in the X-axis direction. In the present embodiment, the secured cover body wall 230 is integral with adjacent ones of the lateral surfaces of the secured cover 221. Alternatively, the secured cover body wall 230 may be a component separate from the secured cover 221. In this case, the secured cover body wall 230 may be retrofitted to the secured cover 221.

Figure 6A:
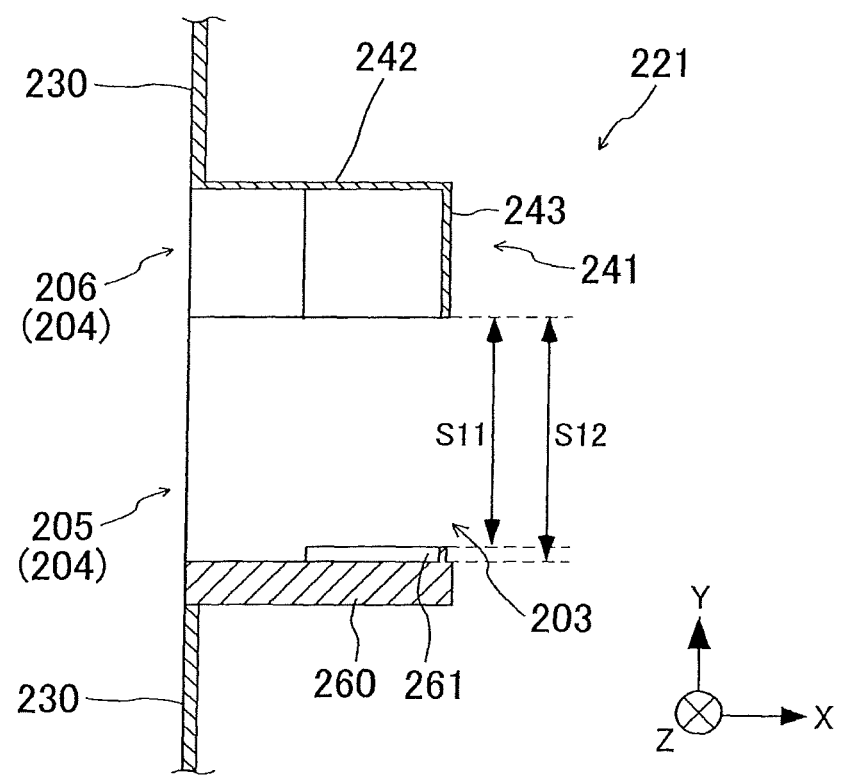
FIG. 6A is a cross-sectional view of the secured cover taken along the line VIA-VIA in FIG. 5.
Figure 6B:
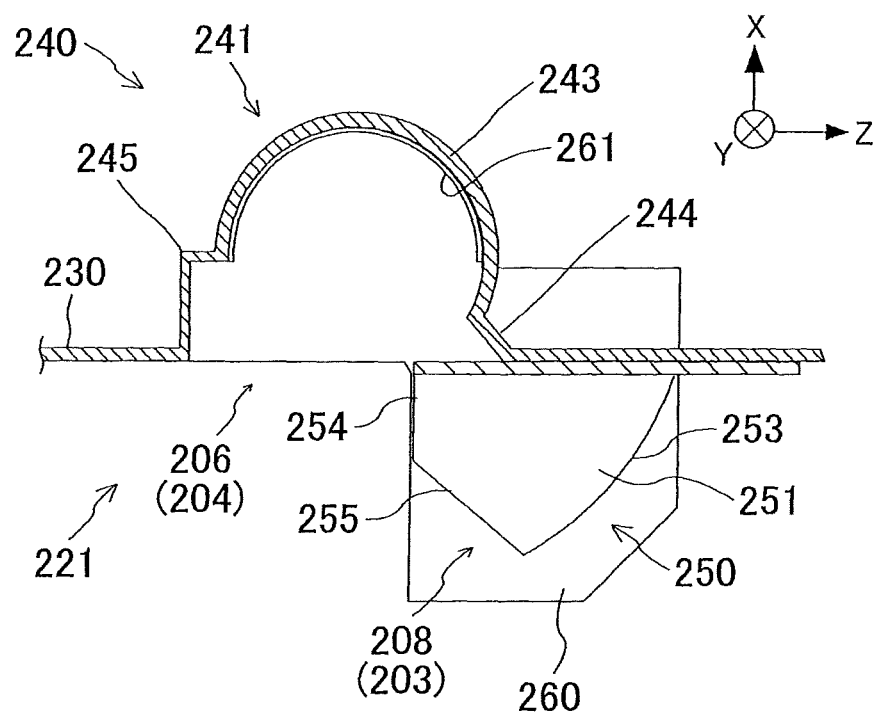
FIG. 6B is a cross-sectional view of the secured cover taken along the line VIB-VIB in FIG. 5.
Figure 6C:
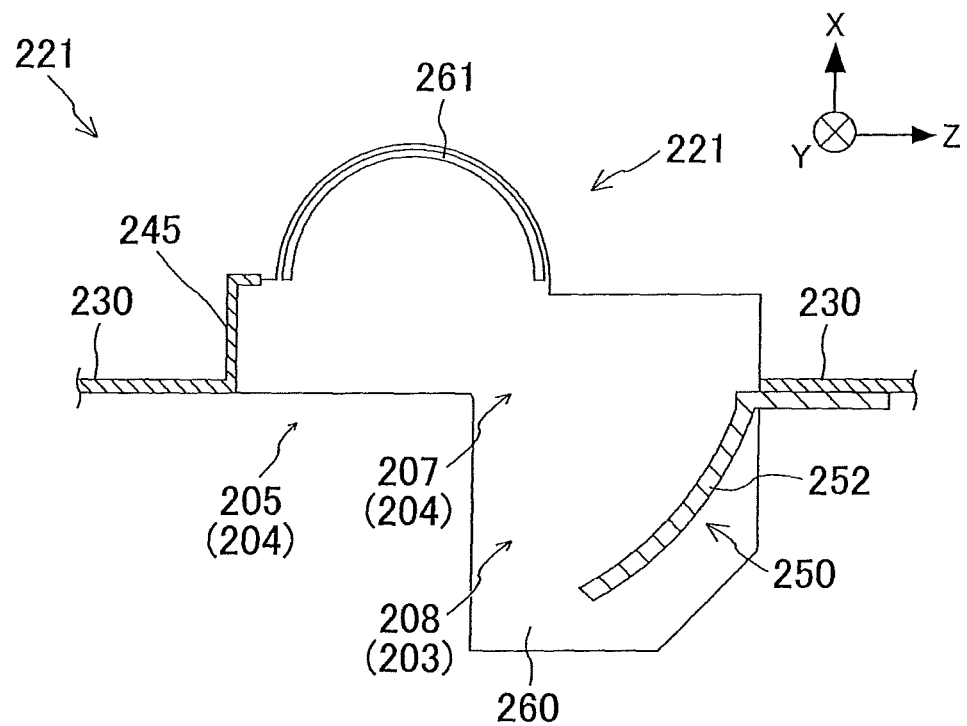
FIG. 6C is a cross-sectional view of the secured cover taken along the line VIC-VIC in FIG. 5.

The secured cover body wall 230 is provided with a main opening 204 (FIGS. 6A-6C). Through the main opening 204, the intra-machine space and the extra-machine space, partitioned with the secured cover body wall 230, are brought into communication with each other. The main opening 204 corresponds to the opening 203. The arm body 211 passes through the main opening 204 during turning of the arm body 211. The main opening 204 includes three portions, i.e., a first main opening 205, a second main opening 206, and a third main opening 207.

The first main opening 205 defines the lower left portion of the main opening 204 in a front view (see FIG. 5). The second main opening 206 defines the upper left portion of the main opening 204 in the front view. The length of the second main opening 206 in the Z-axis direction is shorter than the length of the first main opening 205 in the Z-axis direction. In the front view, the second main opening 206 overlaps with at least a portion of the recessed cover 240. The third main opening 207 defines the lower right portion of the main opening 204 in the front view. In the front view, the third main opening 207 overlaps with at least a portion of the projecting cover 250. For the sake of clarity, the projecting cover 250 is indicated by the dashed lines in FIG. 5 such that the shape of the third main opening 207 is visible in the front view.

As illustrated in FIGS. 6A and 6B, the recessed cover 240 is recessed inward (i.e., rightward in FIG. 6A) from the secured cover body wall 230. The recessed cover 240 includes a side plate 241 and a top plate 242. The side plate 241 is a plate facing a portion of the main opening 204 in the X-axis direction. The top plate 242 is a plate whose outer shape partially conforms is to the side plate 241. The top plate 242 covers, from above, a region of the main opening 204 surrounded by the side plate 241 (see FIG. 6A).

The side plate 241 includes a first side plate 243, a second side plate 244, and a third side plate 245. The first side plate 243 is a curved plate that is in the form of a segment of a circle in the plan view. The first side plate 243 has a curvature defined around the turning center P of the arm body 211 (see FIG. 4A and FIG. 8B). The movable cover 222 is therefore turnable relative to the secured cover 221 about an axis (P) extending parallel to the portion of the wall 230 adjoining the cover opening 203. The second side plate 244 is a flat plate extending radially outward from a first circumferential end of the first side plate 243 (i.e., the right end of the first side plate 243 in FIG. 6B). The second side plate 244 is connected to the secured cover body wall 230. The third side plate 245 is a bent plate extending from a second circumferential end of the first side plate 243 (i.e., the left end of the first side plate 243 in FIG. 6B). The third side plate 245 is connected to the secured cover body wall 230.

As illustrated in FIGS. 6A and 6B, the second main opening 206 is covered with the first side plate 243 and the third side plate 245. A portion of the first side plate 243 and the second side plate 244 extend beyond the second main opening 206 and to the third main opening 207. The third side plate 245 extends beyond the second main opening 206 and to the first main opening 205. The lower end of the third side plate 245 is in contact with the bottom plate 260. In other words, the third side plate 245 covers a portion of the first main opening 205. Specifically, the third side plate 245 covers the left end portion of the first main opening 205 as illustrated in FIG. 6C.

As illustrated in FIGS. 6B and 6C, the projecting cover 250 projects to the extra-machine space (i.e., downward in FIG. 6B) from the secured cover body wall 230. The projecting cover 250 is disposed to cover the right edge portion of the main opening 204 in the front view. In other words, the projecting cover 250 is disposed to cover the third main opening 207 from the extra-machine space. The projecting cover 250 includes a top plate 251 and a side plate 252.

The top plate 251 is disposed on a portion of the secured cover body wall 230 adjacent to the upper edge of the third main opening 207 in the front view. The outer peripheral surface of the top plate 251 is provided with a first region 253, a second region 254, and a third region 255. The first region 253 is disposed on the upper right portion of the third main opening 207 in the front view. The first region 253 extends toward the second main opening 206 in the front view, such that the first region 253 is in the form of a segment of a circle in the plan view.

As illustrated in FIGS. 6B and 6C, the second region 254 extends vertically or substantially vertically from a portion of the secured cover body wall 230 adjacent to the left edge of the third main opening 207 (i.e., the boundary between the first main opening 205 and the third main opening 207). The third region 255 extends straightly between the first region 253 and the second region 254. The length of extension of the first region 253 from the secured cover body wall 230 is longer than the length of extension of the second region 254 from the secured cover body wall 230. An end of the first region 253 away from the secured cover body wall 230 is located rightward of the second region 254 and the third region 255 in the front view. The angle between the second region 254 and the third region 255 is set at 130 degrees.

The side plate 252 is a curved plate extending downward to the bottom plate 260 from the outer peripheral end of the first region 253 (see FIGS. 6A to 6C). The lower end of the side plate 252 is in contact with the bottom plate 260.

The first region 253 is in the form of a segment of a circle drawn around the turning center P of the arm base 215 (see FIG. 4A). The angle at the circumference of the first region 253 is set at 40 degrees. The radius of curvature of the inner peripheral surface of the side plate 252 is set to be greater than the turning radius of the first gripper 212a and the second gripper 212b (see FIG. 4A) that turn around the turning center P of the arm body 211. More specifically, the radius of curvature of the inner peripheral surface of the side plate 252 is set such that the workpiece W and the side plate 252 will not interfere with each other when the arm body 211 turns, with the workpiece W gripped by the first gripper 212a or the second gripper 212b.

As illustrated in FIGS. 6A to 6C, the bottom plate 260 is a plate secured to a portion of the secured cover body wall 230 adjacent to the lower ends of the first main opening 205 and the third main opening 207. The bottom plate 260 extends over the intra-machine space inside the machine tool 1 and the extra-machine space outside the machine tool 1. The upper surface of the bottom plate 260 faces the recessed cover 240 in the Y-axis direction in the intra-machine space.

The upper surface of the bottom plate 260 is provided with a semicircular bottom plate projection 261 protruding toward the first side plate 243. As illustrated in FIG. 6B, the bottom plate projection 261 is in the form of a segment of a circle conforming to the first side plate 243. In other words, the bottom plate projection 261 is in the form of a segment of a circle drawn around the turning center P of the arm body 211 (see FIG. 4A). The radius of curvature of the outer peripheral surface of the bottom plate projection 261 is substantially equal to the radius of curvature of the outer peripheral surface of the first side plate 243. A clearance S11 is created between the bottom plate projection 261 and the lower end of the first side plate 243. The clearance S11 defines a portion of the opening 203. The clearance S11 has a size that allows passage of the arm body 211 therethrough.

In addition to the clearance S11, a clearance S12 is created between the upper surface of the bottom plate 260 and the lower end of a portion of the first side plate 243 that does not face the bottom plate projection 261, and between the upper surface of the bottom plate 260 and the lower end of the second side plate 244. The clearance S12 defines a portion of the opening 203.

The bottom plate 260 faces the top plate 251 in the Y-axis direction in the extra machine space. A region surrounded by the projecting cover 250 and the bottom plate 260 is in communication with the third main opening 207. This region has a size that allows passage of the arm body 211 therethrough. An opening 208 is defined by the second and third regions 254 and 255 of the top plate 251, the end face of an end of the side plate 252 away from the secured cover body wall 230 and the bottom plate 260. The opening 208 defines a portion of the opening 203.

The opening 203 is thus defined by the clearances created between the recessed cover 240 and the bottom plate 260 and between the projecting cover 250 and the bottom plate 260. The opening 203 is defined such that the opening 203 is closable with the movable cover 222.

As illustrated in FIGS. 7A to 8A, the movable cover 222 includes a supporting plate 270, a curved plate 280, and an extended plate 290.

The supporting plate 270 is a plate secured to the lower end surface of the arm base 215. In other words, the supporting plate 270 of the movable cover 222 is secured to the arm body 211. The arm body 211 is coupled to the arm turning driver 213. The arm turning driver 213 is secured to the top plate 242. With this arrangement, the arm body 211 and the movable cover 222 are supported by the secured cover 221 such that the arm body 211 and the movable cover 222 are turnable relative to the secured cover 221.

The movable cover 222 and the arm body 211 of the workpiece replacing apparatus 200 are thus integral with each other. The movable cover 222 turns around the turning center P of the arm body 211 in conjunction with the turning of the arm body 211. The supporting plate 270 has a substantially fan-like shape in the plan view such that the supporting plate 270 radially extends from the turning center P of the movable cover 222. The supporting plate 270 faces the bottom plate 260 in the Y-axis direction.

The curved plate 280 extends in the Y-axis direction from the outer peripheral end of the supporting plate 270. In the plan view, the curved plate 280 is substantially in the form of a segment of a circle drawn around the turning center P of the movable cover 222 (i.e., the turning center P of the arm base 215). The curved plate 280 is disposed around the turning center P of the movable cover 222. The angle at the circumference of the curved plate 280 is 220 degrees as viewed in the Y-axis direction.

Figure 7A:
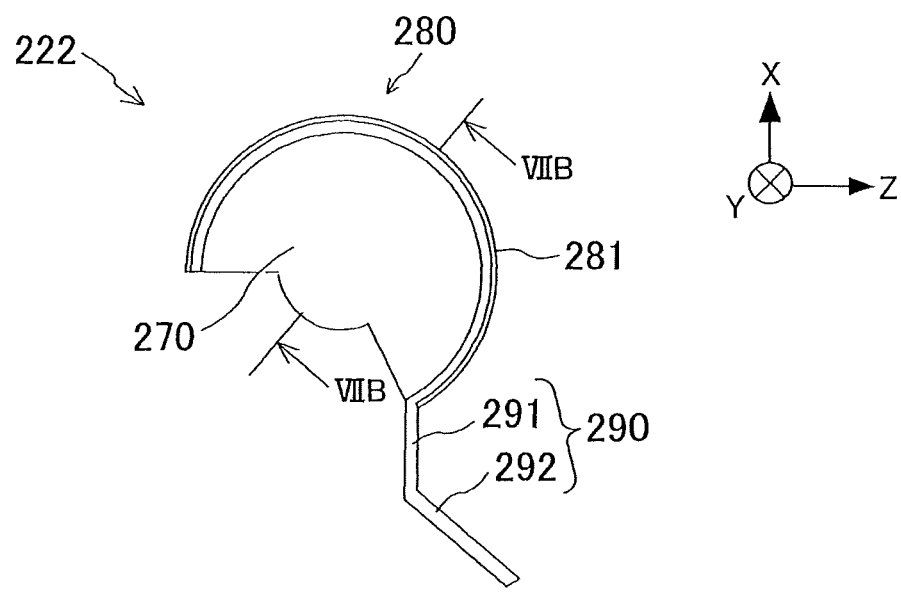
FIG. 7A is a plan view of a movable cover.
Figure 7B:
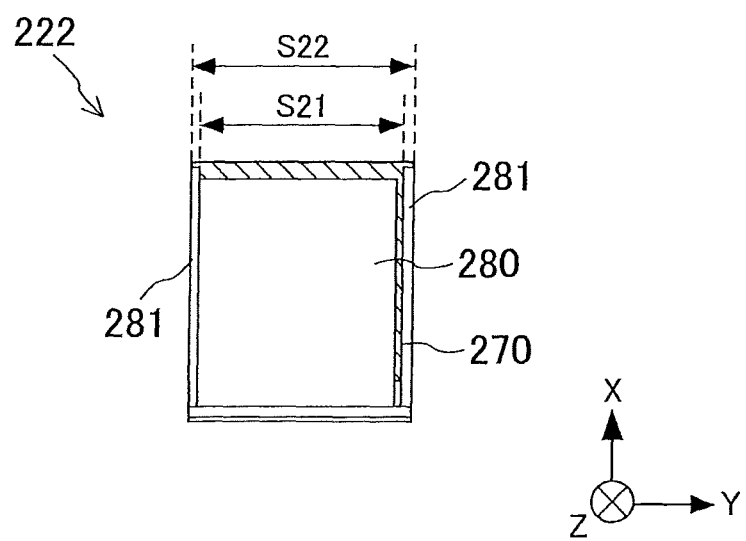
FIG. 7B is a cross-sectional view of the movable cover taken along the line VIIB-VIIB in FIG. 7A.
Figure 8A:
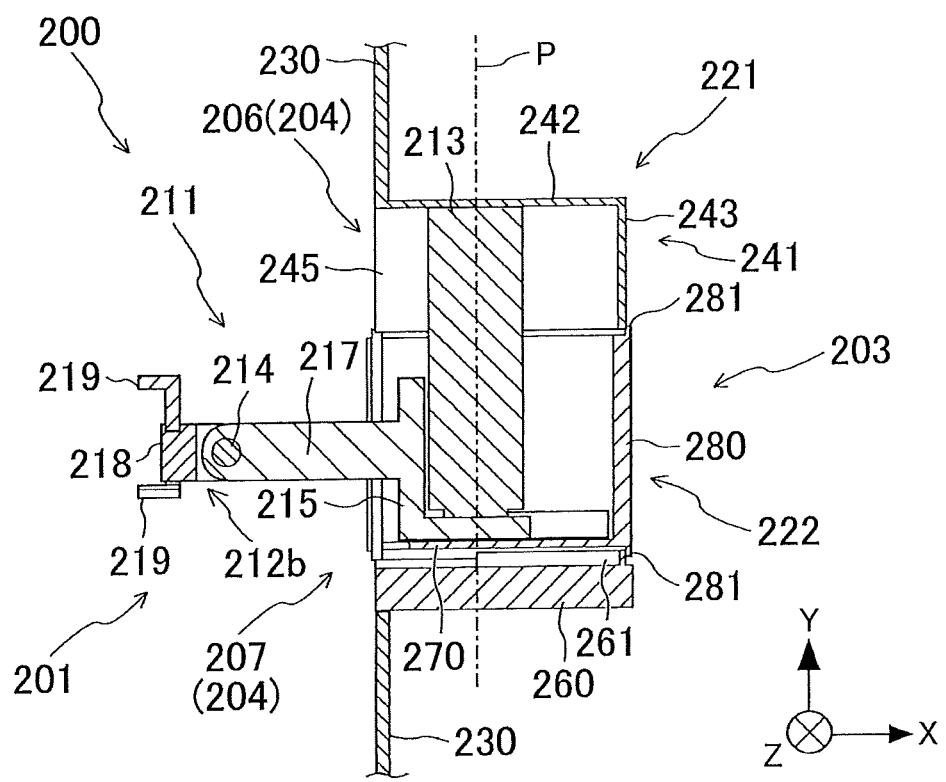
FIG. 8A is a cross-sectional view of the workpiece replacing apparatus taken along the line VIIIB-VIIIB in FIG. 2.

The curved plate 280 is provided with upper and lower curved projections 281. As illustrated in FIGS. 7B and 8A, the upper curved projection 281 extends upward in the Y-axis direction from the outer peripheral surface of the curved plate 280, and the lower curved projection 281 extends downward in the Y-axis direction from the outer peripheral surface of the curved plate 280. Each curved projection 281 is in the form of a segment of a circle conforming to the bottom plate projection 261 of the bottom plate 260 and conforming to an arc-shaped portion of the top plate 242 of the recessed cover 240 that faces the bottom plate projection 261. In other words, each curved projection 281 is in the form of a segment of a circle drawn around the turning center P of the movable cover 222. The radius of curvature of the inner peripheral surface of each curved projection 281 is substantially equal to or slightly larger than the radius of curvature of the outer peripheral surface of the bottom plate projection 261 and the radius of curvature of the outer peripheral surface of the arc-shaped portion of the top plate 242.

The inner peripheral surface of the curved plate 280 has a length S21 smaller than the clearance S11 created between the bottom plate projection 261 and the lower end of the first side plate 243. The outer peripheral surface of the curved plate 280, including the outer peripheral surfaces of the upper and lower curved projections 281, has a length S22 larger than the clearance S11 created between the bottom plate projection 261 and the lower end of the first side plate 243 and smaller than the clearance S12 created between the lower end of the second side plate 244 and the upper surface of the bottom plate 260.

The arrangement just described allows placement of the curved plate 280 of the movable cover 222 in the clearance S11. Disposing the curved plate 280 in the clearance S11 enables the movable cover 222 to close the clearance S11, i.e., the opening 203. With the curved plate 280 disposed in the clearance S11, the bottom plate projection 261 partially overlaps with the lower curved projection 281 in a radial direction (i.e., a direction perpendicular or substantially perpendicular to the Y-axis direction). The movable cover 222 is thus able to prevent chips and/or other substances, produced in the intra-machine space inside the machine tool 1, from scattering to the extra-machine space through the clearance S11.

The extended plate 290 includes a first extended plate 291 and a second extended plate 292. The first extended plate 291 is a flat plate extending from one circumferential end of the curved plate 280 in a radial direction with respect to the turning center P of the movable cover 222. The second extended plate 292 is a flat plate extending from an end of the first extended plate 291 located away from the curved plate 280. The first extended plate 291 and the second extended plate 292 extend in different directions.

The bent shape of the connection between the curved plate 280 and the first extended plate 291 conforms to the bent shape of the connection between the first side plate 243 and the second side plate 244 of the recessed cover 240. The angle between the first extended plate 291 and the second extended plate 292 is 140 degrees. The first extended plate 291 is disposed to overlap with the lower end of the second side plate 244 in the Y-axis direction, so that the second extended plate 292 is disposed to overlap with the third main opening 207 in the Y-axis direction (see FIG. 10A).

Figure 8B:
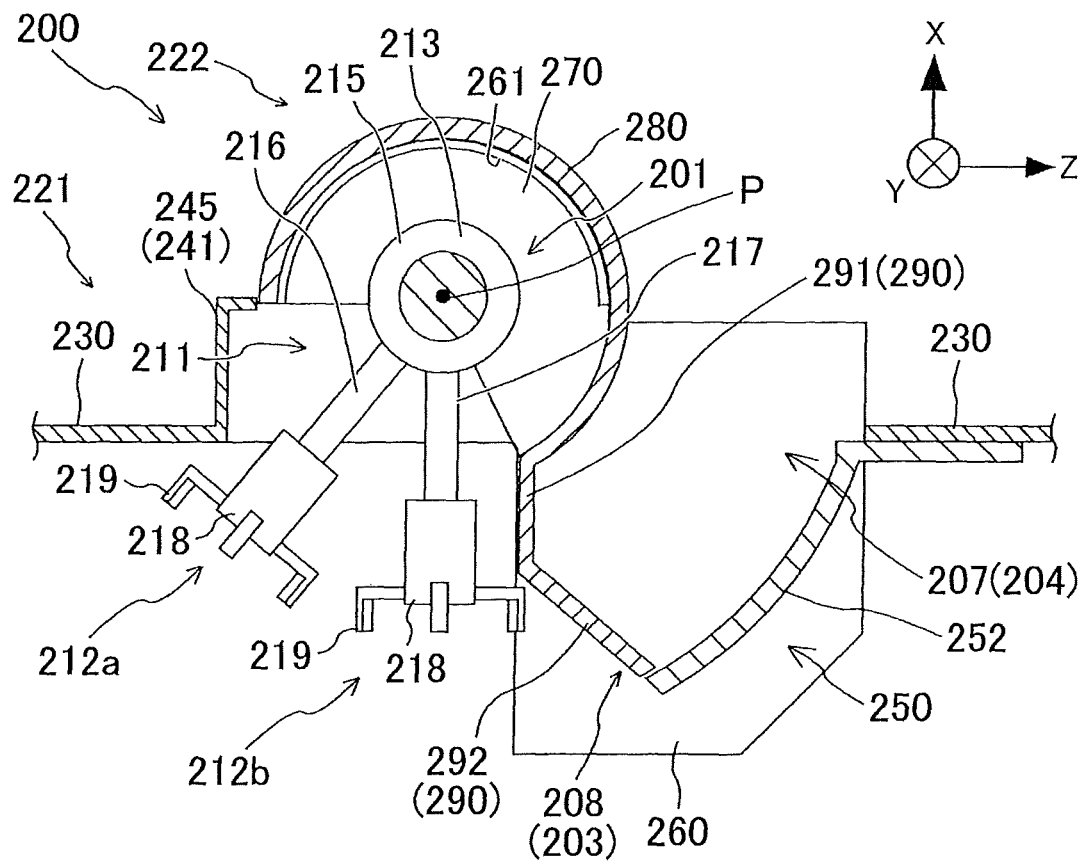
FIG. 8B is a cross-sectional view of the workpiece replacing apparatus taken along the line VIIIA-VIIIA in FIG. 2.

As illustrated in FIG. 8B, the bent shape of the connection between the first extended plate 291 and the second extended plate 292 conforms to the bent shape of the connection between the second region 254 and the third region 255 of the projecting cover 250. Accordingly, with the first extended plate 291 and the second extended plate 292 respectively overlapping with the second region 254 and the third region 255 in the Y-axis direction, the extended plate 290 closes the opening 208 and the movable cover 222 closes the opening 203.

The positional relationship between the arm body 211 and the movable cover 222 is such that with the extended plate 290 located between the third main opening 207 and the opening 208, the first arm 216 and the second arm 217 of the workpiece replacing apparatus 200 are located outward of the secured cover body wall 230.

Referring now to FIG. 9, the controller 300 will be described. As illustrated in FIG. 9, the controller 300 includes a machining apparatus controller 310 and an arm device controller 320. The machining apparatus controller 310 controls operations of the machining apparatus 100. The arm device controller 320 controls operations of the arm device 201.

The machining apparatus controller 310 includes a tool rotation control unit 311, a workpiece rotation control unit 312, a workpiece turning control unit 313, and a position control unit 314.

The tool rotation control unit 311 controls driving of the spindle motor 26 so as to rotate the gear cutter 60 mounted on the spindle 25. The workpiece rotation control unit 312 controls driving of the spindle motor 33 so as to rotate the workpiece W mounted on the spindle 32. The controller 300 thus synchronously rotates the workpiece W and the gear cutter 60.

The workpiece turning control unit 313 controls driving of the workpiece turning driver 52 so as to rotate the rotation table 51 around the B axis. The controller 300 thus changes the orientation of the spindle 32 during machining of the workpiece W such that the rotation axis of the workpiece W inclines relative to the rotation axis of the gear cutter 60. In passing the workpiece W to the arm device 201, the controller 300 causes the spindle 32 to face in a direction in which the workpiece W is deliverable to the arm device 201.

The position control unit 314 controls driving of the X-axis driver 42 so as to move the transportation table 41 in the X-axis direction. The controller 300 thus moves the workpiece retainer 30, disposed on the transportation table 41, relative to the tool retainer 20 for machining of the workpiece W, so that the workpiece W is located at the machining position. In passing the workpiece W to the arm device 201, the controller 300 moves the workpiece retainer 30 relative to the arm device 201, so that the workpiece W is located at the delivery position.

The arm device controller 320 includes an arm turning control unit 321 and a gripper turning control unit 322. The arm turning control unit 321 controls driving of the arm turning driver 213 so as to turn the arm body 211 and the movable cover 222. The workpiece replacing apparatus 200 thus opens and closes the opening 203 by turning the movable cover 222 concurrently with delivery of the workpiece W between the intra-machine space inside the machine tool 1 and the extra-machine space outside the machine tool 1.

The gripper turning control unit 322 controls driving of the first gripper turning driver 214a so as to turn the first gripper 212a relative to the first arm 216, and controls driving of the second gripper turning driver 214b so as to turn the second gripper 212b relative to the second arm 217. The controller 300 thus changes the orientation of the workpiece W such that the workpiece W gripped by the first gripper 212a assumes a position suitable for delivering the workpiece W to the workpiece retainer 30, and changes the orientation of the workpiece W such that the workpiece W gripped by the second gripper 212b assumes a position suitable for delivering the workpiece W to the conveyor 2.

Referring now to FIGS. 10A to 10F, a series of operations to be performed by the workpiece replacing apparatus 200 will be described. The series of operations ranges from delivering the pre-machined workpiece W into the machining apparatus 100 to delivering the machined workpiece W out of the machining apparatus 100.

Figure 10A:
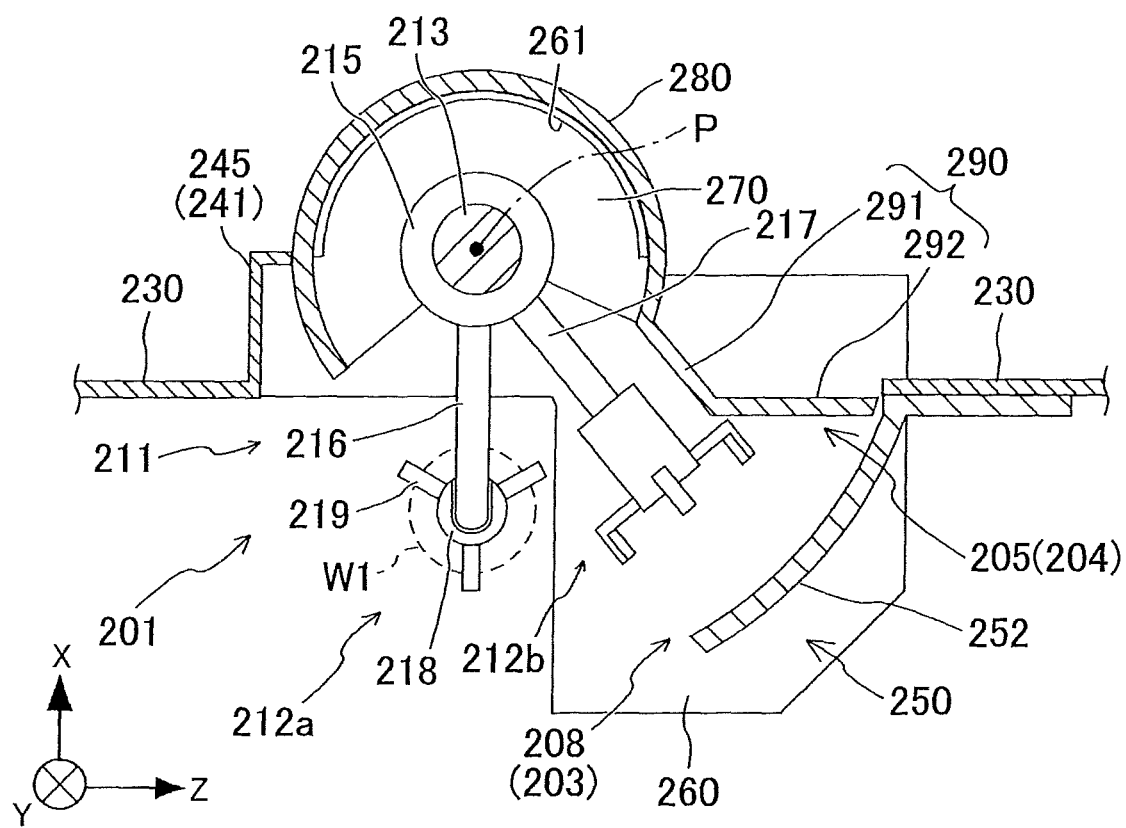
FIG. 10A is a diagram illustrating the workpiece replacing apparatus when the arm device is in a first extra-machine state and receives a pre-machined workpiece from a conveyor.

As illustrated in FIG. 10A, the conveyor 2 conveys a pre-machined workpiece W1 to the delivery position where the arm device 201 is able to receive the workpiece W1. During this operation, the arm device 201 is put on standby such that the arm device 201 is in a first extra-machine state where the first gripper 212a is able to grip the workpiece W1 conveyed to the delivery position. Specifically, the workpiece W1 is conveyed to the delivery position, with the rotation axis of the workpiece W1 oriented in the Y-axis direction, while the arm device 201 is put on standby, with the first gripper 212a turned such that the gripping lugs 219 face downward. After the pre-machined workpiece W1 is conveyed to the delivery position, the arm device 201 grips the workpiece W1 with the first gripper 212a.

During this operation, the first arm 216 and the second arm 217 are located in the extra-machine space outside the machine tool 1. The opening 203 is closed with the movable cover 222. Thus, with the arm device 201 in the first extra-machine state, the machine tool 1 is able to prevent chips and/or other substances, produced by machining of the workpiece W by the machining apparatus 100 in the intra-machine space, from scattering to the extra-machine space. In other words, the machine tool 1 is able to machine the workpiece W by the machining apparatus 100 while the arm device 201 is put on standby until the pre-machined workpiece W1 is conveyed to the delivery position.

Figure 10B:
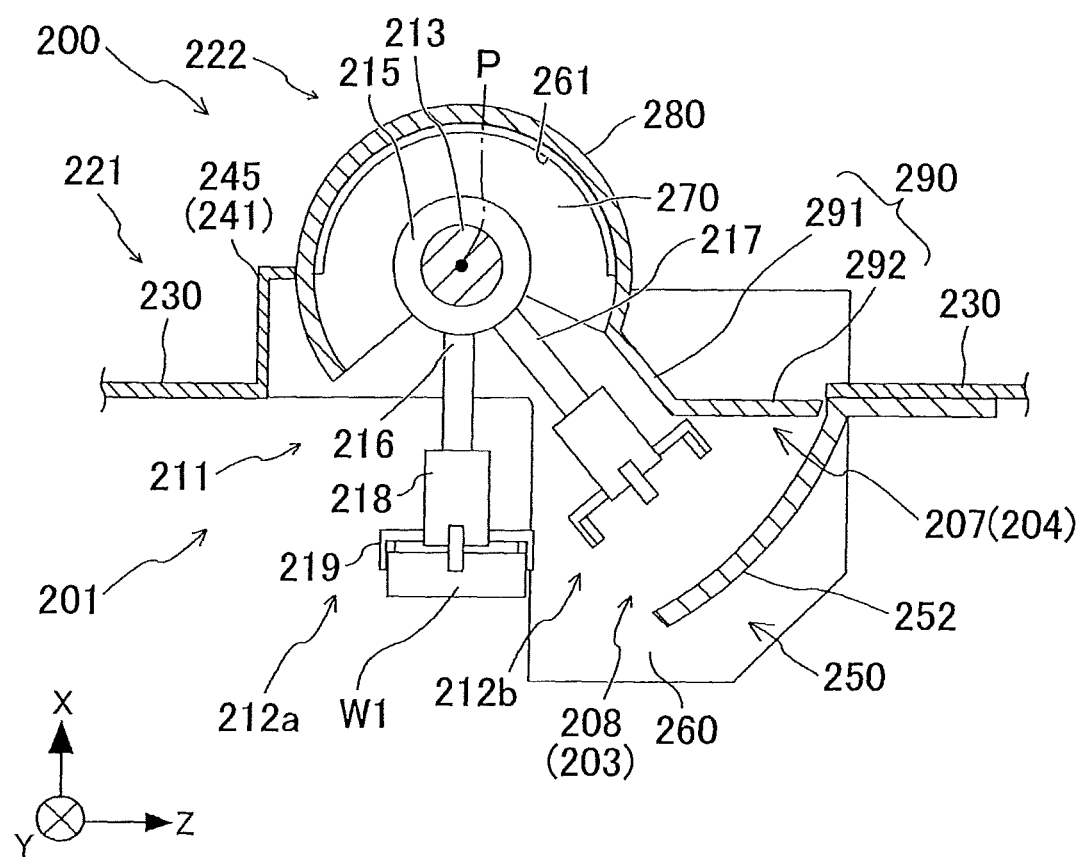
FIG. 10B is a diagram illustrating the workpiece replacing apparatus after the first gripper is turned from its position illustrated in FIG. 10A.

After the first gripper 212a has received the workpiece W1, the arm device 201 turns the first gripper 212a so as to change the orientation of the workpiece W1 as illustrated in FIG. 10B. This changes the orientation of the rotation axis of the workpiece W1 gripped by the first gripper 212a (i.e., the position of the workpiece W1 oriented in the Y-axis direction), such that the rotation axis of the workpiece W1 is oriented in the X-axis direction.

After the machining apparatus 100 has machined the workpiece W, the arm device 201 turns the arm body 211 in the counterclockwise direction illustrated in FIG. 10B. The workpiece W1 gripped by the first gripper 212a is thus delivered into the intra-machine space inside the machine tool 1 from the extra-machine space through the opening 203. During this operation, the movable cover 222 turns in conjunction with the movement of the arm body 211 so as to open the opening 203. This enables the workpiece replacing apparatus 200 to avoid a situation where the arm body 211 and the workpiece W1 gripped by the first gripper 212a interfere with the movable cover 222. Consequently, the arm body 211 is able to start delivering the workpiece W1 into the machine tool 1 without having to wait until the opening 203 is completely opened.

Figure 10C:
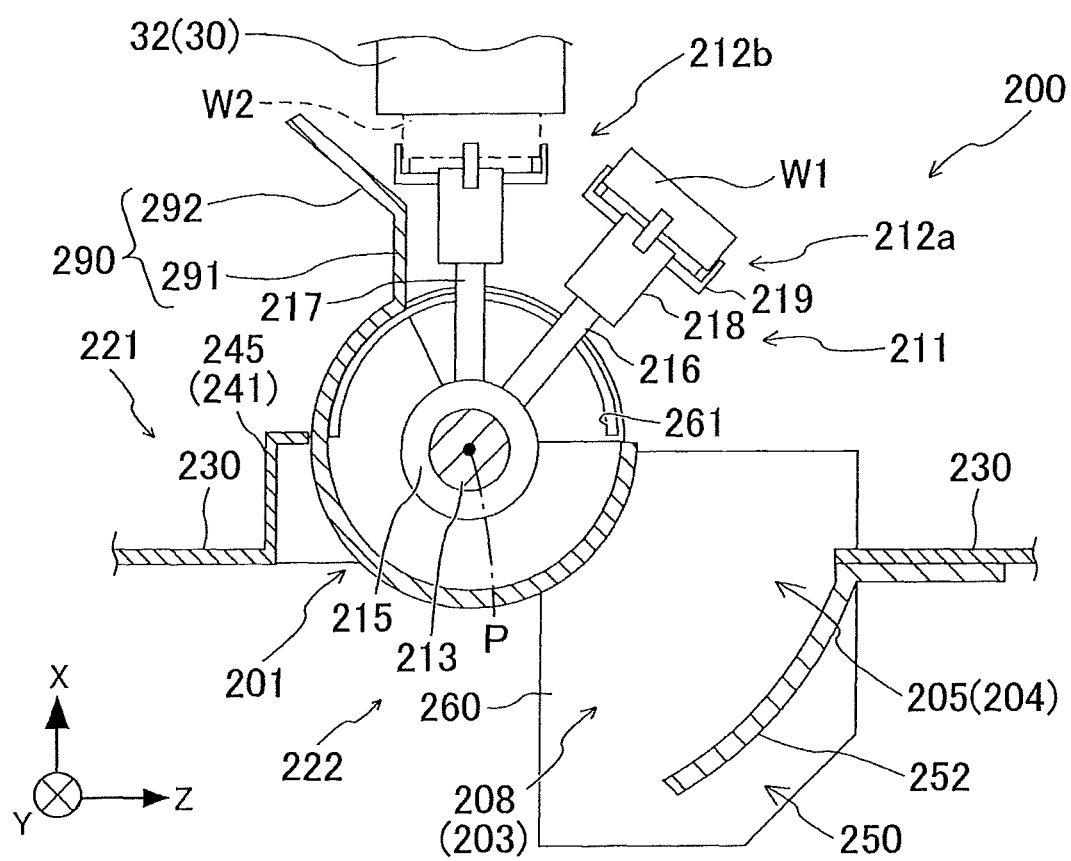
FIG. 10C is a diagram illustrating the workpiece replacing apparatus when the arm device is in a first intra-machine state and receives a machined workpiece from a workpiece retainer.

As illustrated in FIG. 10C, the arm device 201 shifts from the first extra-machine state (see FIG. 10B) to a first intra-machine state where the second gripper 212b is able to grip a machined workpiece W2 retained by the workpiece retainer 30. Concurrently with this operation, the workpiece retainer 30 moves from the machining position to the delivery position where the workpiece retainer 30 is able to pass the machined workpiece W2 to the arm device 201. The workpiece retainer 30 then passes the machined workpiece W2 to the second gripper 212b.

Figure 10D:
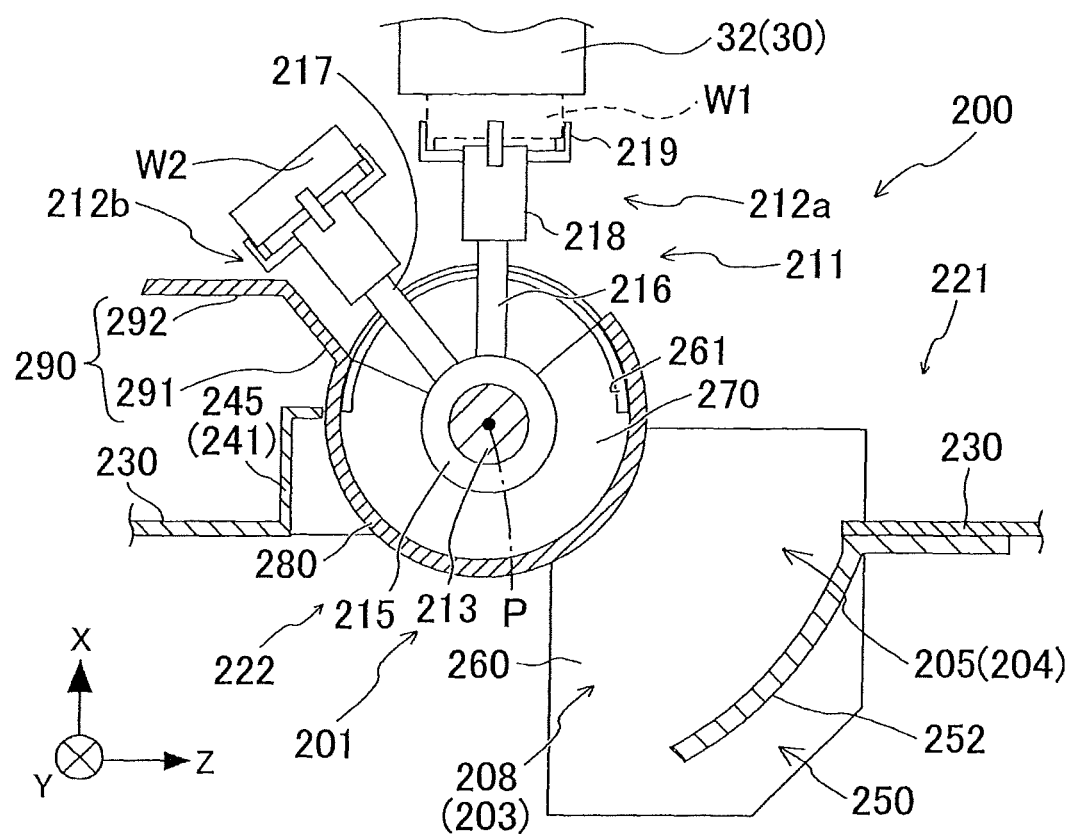
FIG. 10D is a diagram illustrating the workpiece replacing apparatus when the arm device is in a second intra-machine state and passes the pre-machined workpiece to the workpiece retainer.

As illustrated in FIG. 10D, the arm device 201 subsequently turns the arm body 211 in the counterclockwise direction so as to shift from the first intra-machine state (see FIG. 10C) to a second intra-machine state where the arm device 201 is able to pass the pre-machined workpiece W1, gripped by the first gripper 212a, to the workpiece retainer 30. Upon completion of the shift of the arm device 201 to the second intra-machine state, the workpiece retainer 30 receives the pre-machined workpiece W1 from the first gripper 212a.

The arm device 201 subsequently turns the arm body 211 in the clockwise direction (see FIG. 10E) so as to deliver the workpiece W2, gripped by the second gripper 212b, from the intra-machine space inside the machine tool 1 to the extra-machine space outside the machine tool 1 through the opening 203. This closes the opening 203 with the movable cover 222. After movement of the workpiece retainer 30 from the delivery position to the machining position, the machining apparatus 100 starts machining the workpiece W retained by the workpiece retainer 30.

The movable cover 222 turns in conjunction with the movement of the arm body 211, so that the distance between the arm device 201 and the movable cover 222 of the workpiece replacing apparatus 200 is maintained constant. This enables the workpiece replacing apparatus 200 to prevent the workpiece W2, delivered by the arm device 201, and the movable cover 222 from interfering with each other. The workpiece replacing apparatus 200 is thus able to concurrently deliver the workpiece W2 out of the machine tool 1 and close the opening 203 with the movable cover 222. The machine tool 1 is able to reduce the time between the start of delivery of the workpiece W2 out of the machine tool 1 and the completion of closing of the opening 203 with the movable cover 222. This makes it possible to reduce the time during which the machine tool 1 waits for the start of machining of the workpiece W by the machining apparatus 100.

Figure 10E:
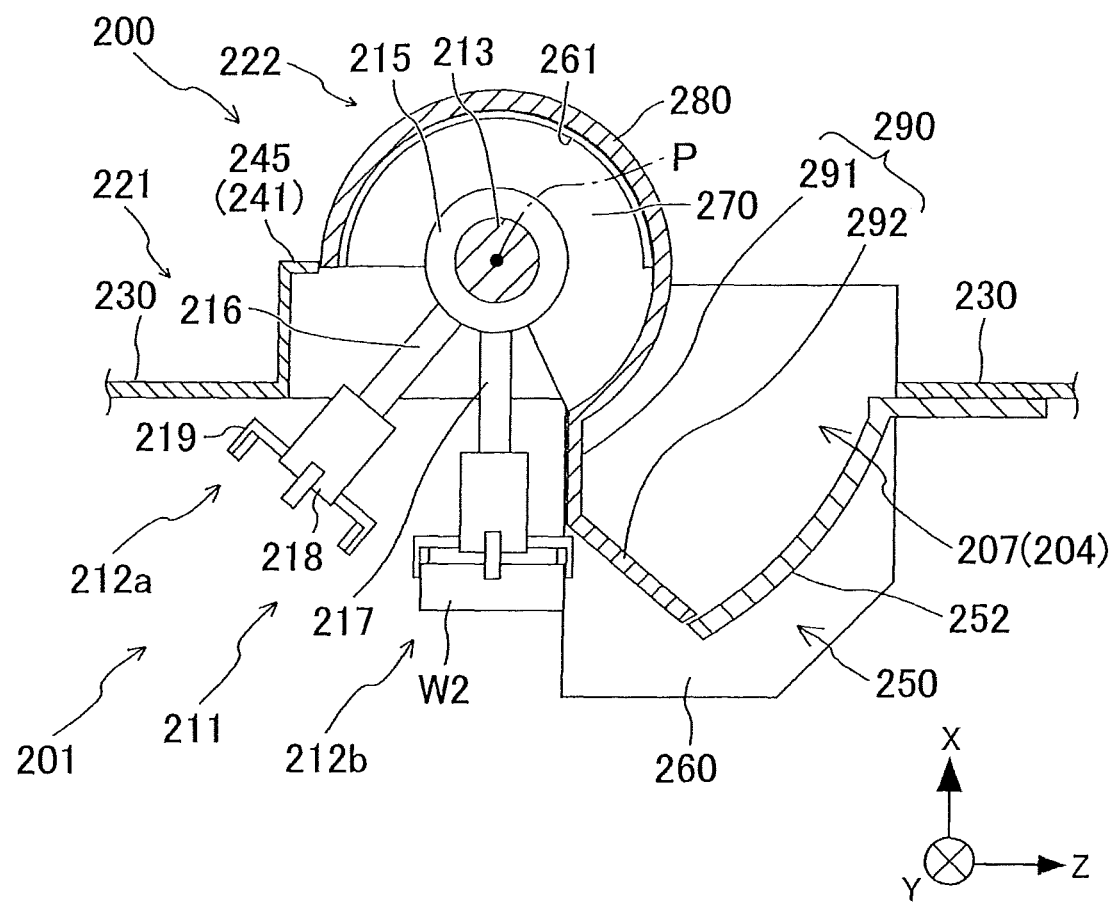
FIG. 10E is a diagram illustrating the workpiece replacing apparatus immediately after the arm device has shifted to a second extra-machine state.
Figure 10F:
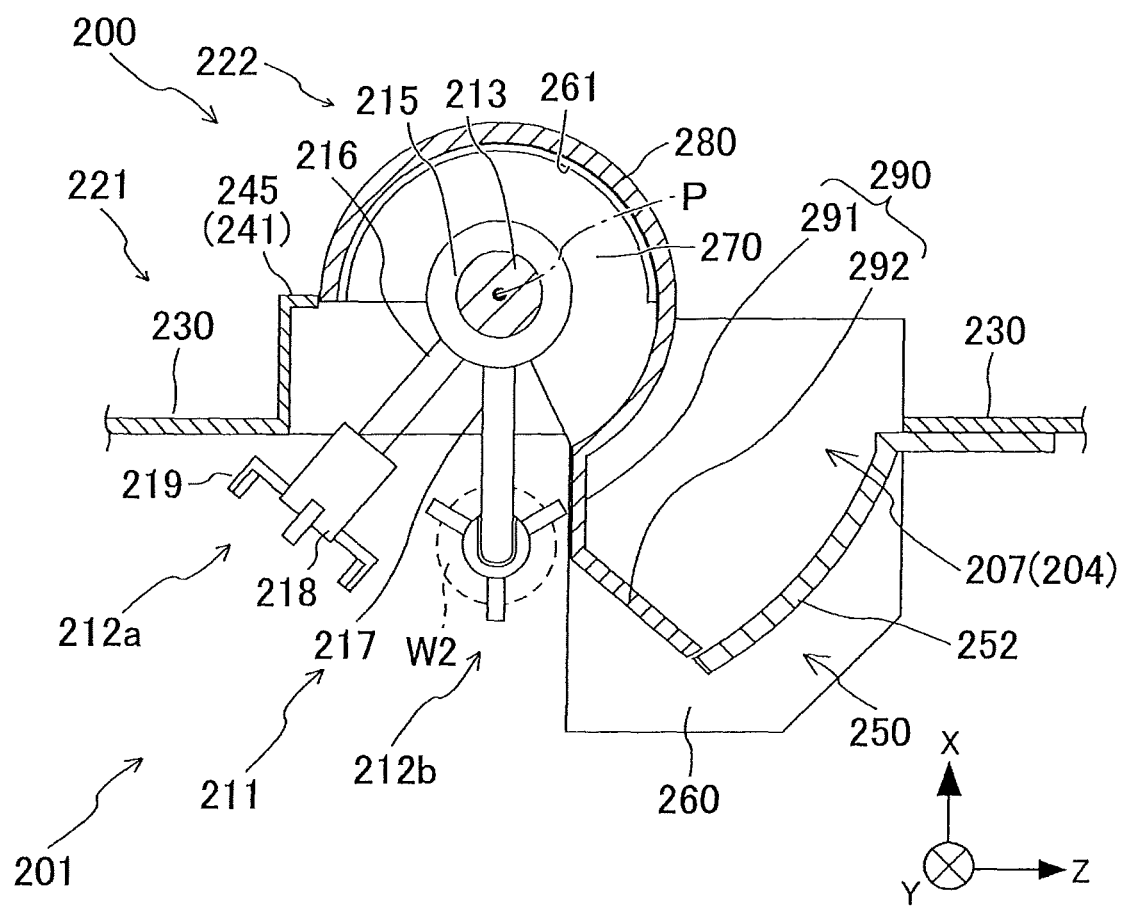
FIG. 10F is a diagram illustrating the workpiece replacing apparatus when the arm device is in the second extra-machine state and passes the machined-workpiece to the conveyor.

As illustrated in FIG. 10E, the arm device 201 shifts from the second intra-machine state (see FIG. 10D) to a second extra-machine state where the arm device 201 is able to pass the machined workpiece W2, gripped by the second gripper 212b, to the conveyor 2. Upon completion of the shift of the arm device 201 to the second extra-machine state, the arm device 201 turns the second gripper 212b such that the gripping lugs 219 face downward, so as to change the orientation of the workpiece W2 as illustrated in FIG. 10F. This changes the orientation of the rotation axis of the workpiece W2 gripped by the second gripper 212b (i.e., the position of the workpiece W2 orientated in the X-axis direction), such that the rotation axis of the workpiece W2 is orientated in the Y-axis direction. The conveyor 2 receives the machined workpiece W2, gripped by the second gripper 212b, from the arm device 201 so as to convey the workpiece W2.

With the arm device 201 in the second extra-machine state, the extended plate 290 of the movable cover 222 is located beyond the third main opening 207 and outward of the secured cover body wall 230. In the present embodiment, the secured cover 221 is provided with the projecting cover 250 projecting to the extra-machine space from the secured cover body wall 230, and the opening 208 has a shape conform ling to the extended plate 290. Thus, with the extended plate 290 located between the third main opening 207 and the opening 208, the movable cover 222 is able to close the opening 203. Accordingly, with the arm device 201 in the second extra-machine state, the workpiece replacing apparatus 200 is able to prevent chips and/or other substances, produced by machining of the workpiece W by the machining apparatus 100 in the intra-machine space, from scattering to the extra-machine space. In other words, the machine tool 1 is able to machine the workpiece W by the machining apparatus 100 while passing the machined workpiece W2 to the conveyor 2.

The arm device 201 then returns to the standby state illustrated in FIG. 10A. Specifically, the arm device 201 turns the second gripper 212b so as to return the orientation of the second gripper 212b to its original orientation, and shifts from the second extra-machine state to the first extra-machine state. The original orientation corresponds to the orientation of the second gripper 212b when the second gripper 212b receives the machined workpiece W2 from the workpiece retainer 30. The arm device 201 is then put on standby until another pre-machined workpiece W1 is delivered to the delivery position by the conveyor 2.

As previously described, the movable cover 222 and the arm body 211 of the workpiece replacing apparatus 200 are integral with each other, so that the movable cover 222 turns in conjunction with movement of the arm body 211. The workpiece replacing apparatus 200 is thus able to open and close the opening 203 with the movable cover 222 concurrently with delivery of the workpiece W into and out of the machine tool 1 by the arm body 211. This makes it possible to reduce cycle time. The arm turning driver 213 of the workpiece replacing apparatus 200 has not only the function of turning the arm body 211 relative to the secured cover 221 but also the function of turning the movable cover 222 relative to the secured cover 221. This feature reduces the number of components of the workpiece replacing apparatus 200, resulting in a reduction in the size of the workpiece replacing apparatus 200.

The first gripper 212a and the second gripper 212b are supported by the arm body 211 such that the first gripper 212a and the second gripper 212b are rotatable relative to the arm body 211. The first gripper 212a is thus able to change the orientation of the workpiece W1 such that the orientation of the workpiece W1 when the first gripper 212a receives the workpiece W1 from the conveyor 2 differs from the orientation of the workpiece W1 when the first gripper 212a passes the workpiece W1 to the workpiece retainer 30. The second gripper 212b is thus able to change the orientation of the workpiece W2 such that the orientation of the workpiece W2 when the second gripper 212b receives the workpiece W2 from the workpiece retainer 30 differs from the orientation of the workpiece W2 when the second gripper 212b passes the workpiece W2 to the conveyor 2. Accordingly, the workpiece replacing apparatus 200 has flexibility in delivering the workpieces W1 and W2 by the conveyor 2 and the arm device 201. Consequently, the present embodiment increases the versatility of the machine tool 1.

The movable cover 222 is turnable relative to the secured cover 221. The range of motion of movable cover 222 is thus smaller than, for example, when the movable cover 222 is slidable. This makes it more likely that the machine tool 1 will prevent the movable cover 222 and other components of the machine tool 1 from interfering with each other. Consequently, the design flexibility of the machine tool 1 increases, so that the machine tool 1 will not increase in size.

The arm body 211 includes the first arm 216 to deliver the pre-machined workpiece W1 into and out of the machine tool 1, and the second arm 217 to deliver the machined workpiece W2 into and out of the machine tool 1. The workpiece replacing apparatus 200 is thus able to deliver the pre-machined workpiece W1 from the extra-machine space into the intra-machine space and deliver the machined workpiece W2 from the intra-machine space to the extra-machine space during a series of operations illustrated in FIGS. 10A to 10F. Consequently, the workpiece replacing apparatus 200 is able to reduce the time required for replacement of the pre-machined workpiece W1 and the machined workpiece W2.

The locations of the first and second arms 216 and 217 of the arm device 201 in the first extra-machine state differ from the locations of the first and second arms 216 and 217 of the arm device 201 in the second extra-machine state. With the arm device 201 in the second extra-machine state, the extended plate 290 is located beyond the third main opening 207 and outward of the secured cover body wall 230. In the present embodiment, the secured cover 221 is provided with the projecting cover 250 projecting to the extra-machine space from the secured cover body wall 230. Thus, with the extended plate 290 located outward of the secured cover body wall 230, the projecting cover 250 closes a space between the third main opening 207 and the extended plate 290.

The workpiece replacing apparatus 200 is thus able to close the opening 203 with the movable cover 222, with the arm device 201 in the first extra-machine state and the second extra-machine state. Accordingly, the machine tool 1 is able to close the opening 203 with the movable cover 222 for a long period of time. In other words, the machine tool 1 enables the machining apparatus 100 to machine the workpiece W in the intra-machine space for a long period of time. Consequently, the machine tool 1 is able to extend the time during which the machine tool 1 machines the workpiece W by the machining apparatus 100 in the intra-machine space concurrently with delivery of the workpieces W1 and W2 between the arm device 201 and the conveyor 2 in the extra-machine space. In other words, the machine tool 1 is able to reduce the waiting time for the start of replacement of the workpiece W or machining of the workpiece W, resulting in a reduction in cycle time.

The workpiece replacing apparatus 200 is configured such that the curved plate 280 is located inward of the secured cover body wall 230, with the arm device 201 in the first extra-machine state and the second extra-machine state. In these states, the opening 203 is closed, so that the machining apparatus 100 is able to machine the workpiece W in the ultra-machine space. The curved plate 280 of the movable cover 222 is in the form of a segment of a circle drawn around the turning center P of the movable cover 222 in the plan view, while the extended plate 290 extends radially from the circumferential end of the curved plate 280. The range of turning of the curved plate 280 responsive to the turning of the movable cover 222 is located inward of the range of motion of the extended plate 290. The workpiece replacing apparatus 200 is thus able to reduce the distance by which the curved plate 280 of the movable cover 222 projects into the intra-machine space from the secured cover body wall 230 during machining by the machining apparatus 100.

The first arm 216 and the second arm 217 of the workpiece replacing apparatus 200 pass through only a region rightward of the turning center P in the front view during movement of the arm body 211 between the extra-machine space outside the machine tool 1 and the intra-machine space inside the machine tool 1. The turning center P of the arm body 211 is located leftward of the main opening 204 in the front view. The main opening 204 of the workpiece replacing apparatus 200 is thus smaller than when the first arm 216 and the second arm 217 pass through both of a region rightward of the turning center P and a region leftward of the turning center P in the front view. This results in a reduction in the size of the movable cover 222 of the workpiece replacing apparatus 200.

The movable cover 222 is able to close the region leftward of the turning center P in the front view with the curved plate 280 while closing the region rightward of the turning center P in the front view with the curved plate 280 whose range of turning is relatively small and the extended plate 290 whose range of turning is relatively large. The workpiece replacing apparatus 200 is thus able to reliably close the opening 203 although the movable cover 222 includes the curved plate 280 whose range of turning is relatively small.

As described above, with the arm device 201 in the first extra-machine state and the second extra-machine state, the movable cover 222 is able to close the opening 203 with the movable cover 222. The radius of curvature of the curved plate 280 is smaller than the turning radius of the end of the first arm 216 (i.e., the first gripper 212a) and the end of the second arm 217 (i.e., the second gripper 212b). The movable cover 222 and the secured cover 221 of the workpiece replacing apparatus 200 are thus smaller than when an entirety of the movable cover 222 is in the form of a segment of a circle such that the turning radius of the movable cover 222 is larger than the turning radius of the end of the first arm 216 and the end of the second arm 217. Consequently, the machine tool 1 is able to reduce the space necessary for placement of the workpiece replacing apparatus 200, resulting in an increase in the design flexibility of the machine tool 1.

Referring now to the flow chart illustrated in FIG. 11, a first workpiece replacing process to be performed by the arm device controller 320 will be described. The first workpiece replacing process is performed when the arm device 201 delivers the pre-machined workpiece W1 into the intra-machine space from the extra-machine space and delivers the machined workpiece W2 to the extra-machine space from the intra-machine space.

Figure 11:
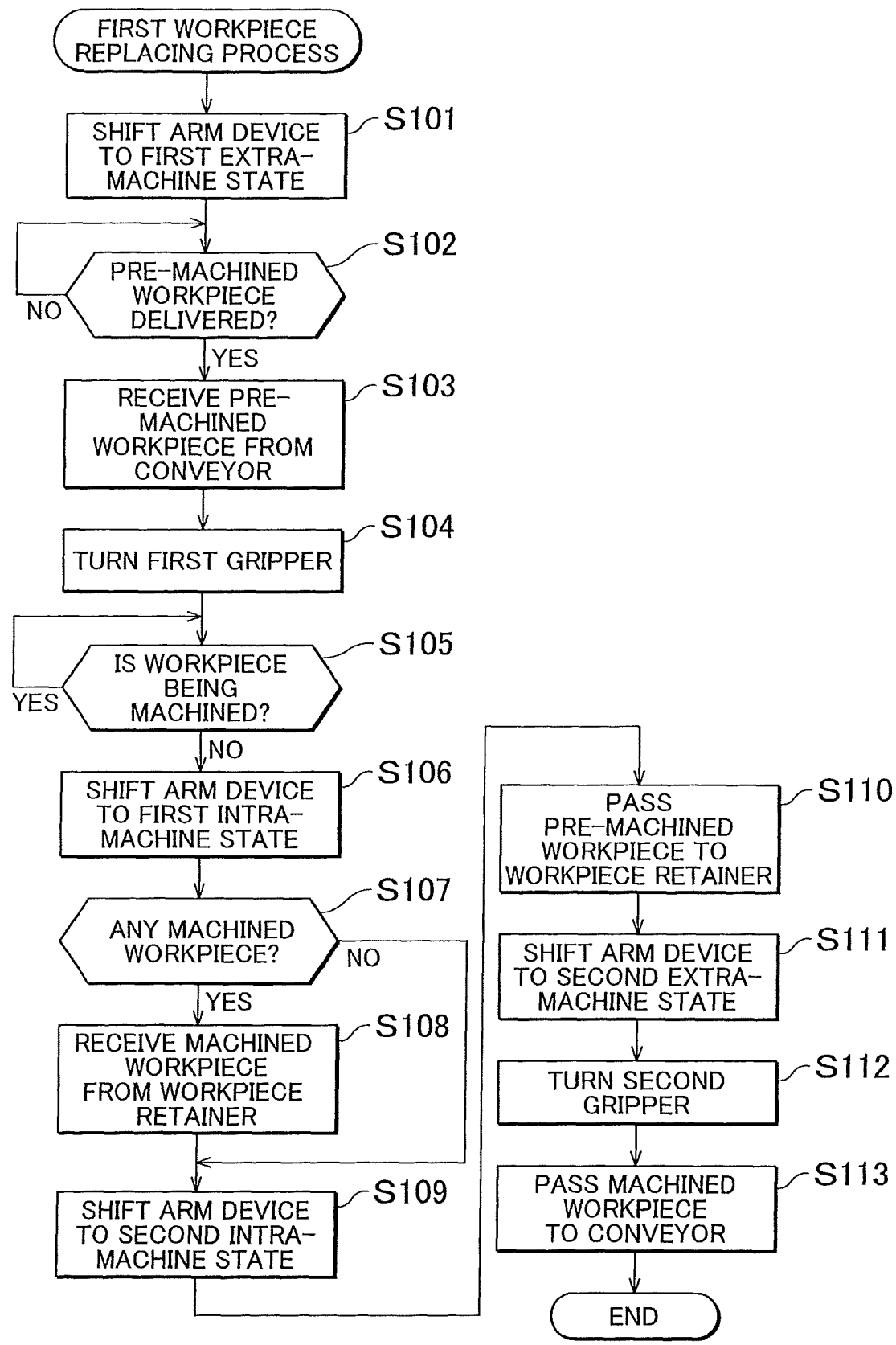
FIG. 11 is a flow chart illustrating a first workpiece replacing process to be performed by an arm device controller.

As illustrated in FIG. 11, the first workpiece replacing process first involves shifting the arm device 201 to the first extra-machine state (S101), and determining whether the pre-machined workpiece W1 has been delivered to the delivery position by the conveyor 2 (S102). When no workpiece W1 has been delivered to the delivery position (i.e., when the answer is No in step S102), the first workpiece replacing process involves performing step S102 again. When the workpiece W1 has been delivered to the delivery position (i.e., when the answer is Yes in step S102), the first workpiece replacing process involves receiving, from the conveyor 2, the pre-machined workpiece W1 by the first gripper 212a as illustrated in FIG. 10A (S103). The first workpiece replacing process then involves turning the first gripper 212a so as to change the orientation of the workpiece W1 as illustrated in FIG. 10B (S104).

After step S104, the first workpiece replacing process involves determining whether the workpiece W is being machined by the machining apparatus 100 in the intra-machine space (S105). When the workpiece W is being machined by the machining apparatus 100 (i.e., when the answer is Yes in step S105), the opening 203 needs to be kept closed. In this case, the first workpiece replacing process involves repeatedly performing step S105 until the machining apparatus 100 finishes machining the workpiece W. When no workpiece W is being machined by the machining apparatus 100 or when the machining apparatus 100 has finished machining the workpiece W (i.e., when the answer is No in step S105), the first workpiece replacing process involves turning the arm body 211 and the movable cover 222 so as to deliver the workpiece W1 into the intra-machine space from the extra-machine space. This shifts the arm device 201 to the first intra-machine state as illustrated in FIG. 10C (S106).

After step S106, the first workpiece replacing process involves determining whether the machined workpiece W2 is in the intra-machine space, i.e., whether the machined workpiece W2 is retained by the workpiece retainer 30 (S107). When no machined workpiece W2 is retained by the workpiece retainer 30 (i.e., when the answer is No in step S107), the first workpiece replacing process involves skipping step S108. In this case, the process goes to step S109.

When the machined workpiece W2 is retained by the workpiece retainer 30 (i.e., when the answer is Yes in step S107), the first workpiece replacing process involves receiving, from the workpiece retainer 30, the machined workpiece W2 by the second gripper 212b (S108). The process then goes to step S109.

The first workpiece replacing process subsequently involves shifting the arm device 201 to the second intra-machine state as illustrated in FIG. 10D (S109). The first workpiece replacing process then involves passing the pre-machined workpiece W1, gripped by the first gripper 212a, to the workpiece retainer 30 (S110). After step S110, the first workpiece replacing process involves turning the arm body 211 and the movable cover 222 so as to deliver the workpiece W2 from the intra-machine space to the extra-machine space. This shifts the arm device 201 to the second extra-machine state as illustrated in FIG. 10E (S111).

After step S111, the first workpiece replacing process involves turning the second gripper 212b so as to change the orientation of the workpiece W1 as illustrated in FIG. 10F (S112). The first workpiece replacing process then involves passing the machined workpiece W2, gripped by the second gripper 212b, to the conveyor 2 (S113). This ends the first workpiece replacing process.

Referring now to the flow chart illustrated in FIG. 12, a second workpiece replacing process to be performed by the machining apparatus controller 310 will be described. The second workpiece replacing process is performed when the workpiece retainer 30 passes the machined workpiece W2 to the arm device 201 and receives the pre-machined workpiece W1 from the arm device 201.

Figure 12:
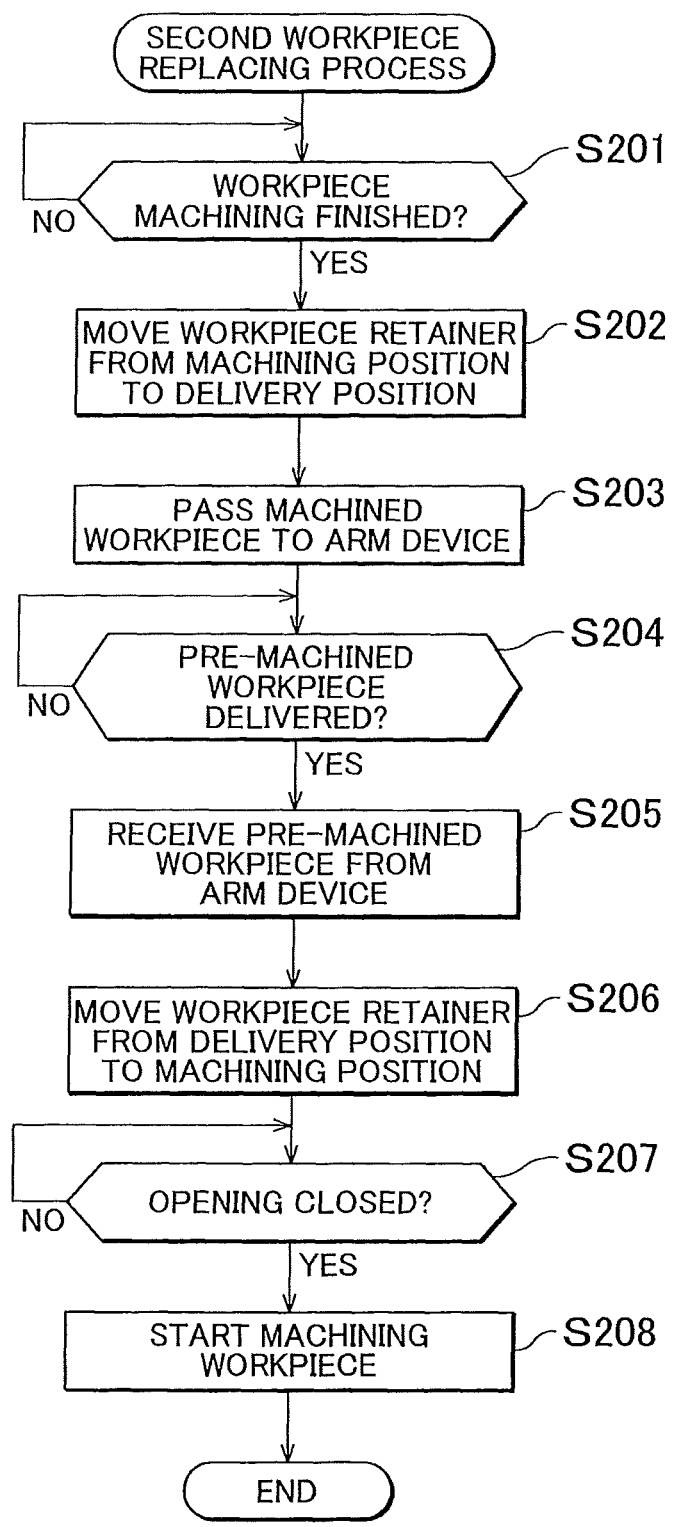
FIG. 12 is a flow chart illustrating a second workpiece replacing process to be performed by a machining apparatus controller.

As illustrated in FIG. 12, the second workpiece replacing process first involves determining whether the machining apparatus 100 has finished machining the workpiece W (S201). When the machining apparatus 100 has not finished machining the workpiece W (i.e., when the answer is No in step S201), the second workpiece replacing process involves repeatedly performing step S201. When the machining apparatus 100 has finished machining the workpiece W (i.e., when the answer is Yes in step S201), the second workpiece replacing process involves controlling the X-axis driver 42 so as to move the workpiece retainer 30 from the machining position to the delivery position where the machined workpiece W2 is to be passed to the arm device 201 (S202).

After step S202, the second workpiece replacing process involves passing the machined workpiece W2 to the arm device 201 (S203). The second workpiece replacing process subsequently involves determining whether the pre-machined workpiece W1 has been delivered into the machine tool 1 by the arm device 201 (S204). When no pre-machined workpiece W1 has been delivered into the machine tool 1 (i.e., when the answer is No in step S204), the second workpiece replacing process involves performing step S204 again. When the pre-machined workpiece W1 has been delivered into the machine tool 1 (i.e., when the answer is Yes in step S204), the second workpiece replacing process involves receiving the pre-machined workpiece W1 from the arm device 201 (S205). The second workpiece replacing process then involves controlling the X-axis driver 42 so as to move the workpiece retainer 30 to the machining position from the delivery position where the workpiece retainer 30 has received the pre-machined workpiece W1 from the arm device 201 (S206).

After step S206, the second workpiece replacing process involves determining whether the opening 203 has been closed with the movable cover 222 (S207). When the opening 203 has not been closed (i.e., when the answer is No in step S207), the second workpiece replacing process involves performing step S207 again. When the opening 203 has been closed (i.e., when the answer is Yes in step S207), the second workpiece replacing process involves starting machining of the workpiece W (S208). This ends the second workpiece replacing process. The machine tool 1 is thus able to reliably prevent chips and/or other substances, produced by machining, from scattering to the extra-machine space through the opening 203.

As described above, the machine tool 1 causes the workpiece retainer 30 to move in the X-axis direction in delivering the workpieces W1 and W2 between the arm device 201 and the workpiece retainer 30. This moves the workpiece retainer 30 to the delivery position where the workpieces W1 and W2 are passed between the workpiece retainer 30 and the arm device 201. The machine tool 1 thus requires no driver to move the first gripper 212a and the second gripper 212b relative to the arm device 201 in the X-axis direction.

The machine tool 1 includes the transporter 40 for use in machining of the workpiece W by the machining apparatus 100. The transporter 40 moves the workpiece retainer 30 from the machining position to the delivery position. In other words, the transporter 40 has not only the function of moving the workpiece retainer 30 relative to the tool retainer 20 for machining of the workpiece W but also the function of moving the workpiece retainer 30 relative to the arm device 201 for delivery of the workpieces W1 and W2 between the workpiece retainer 30 and the arm device 201. The machine tool 1 thus requires no additional driver to be used for delivery of the workpieces W1 and W2 between the workpiece retainer 30 and the arm device 201. Consequently, the machine tool 1 has a simplified structure.

A second embodiment of the invention will be described below. The workpiece replacing apparatus 200 according to the first embodiment includes the movable cover 222 that turns relative to the secured cover 221 in conjunction with operation of the arm device 201. A workpiece replacing apparatus 500 according to the second embodiment includes a movable cover 522 that slides relative to a secured cover 221 in conjunction with operation of an arm device 501. Components of the workpiece replacing apparatus 500 similar to those of the workpiece replacing apparatus 200 according to the first embodiment are identified by the same reference signs, and description thereof will be omitted.

Figure 13A:
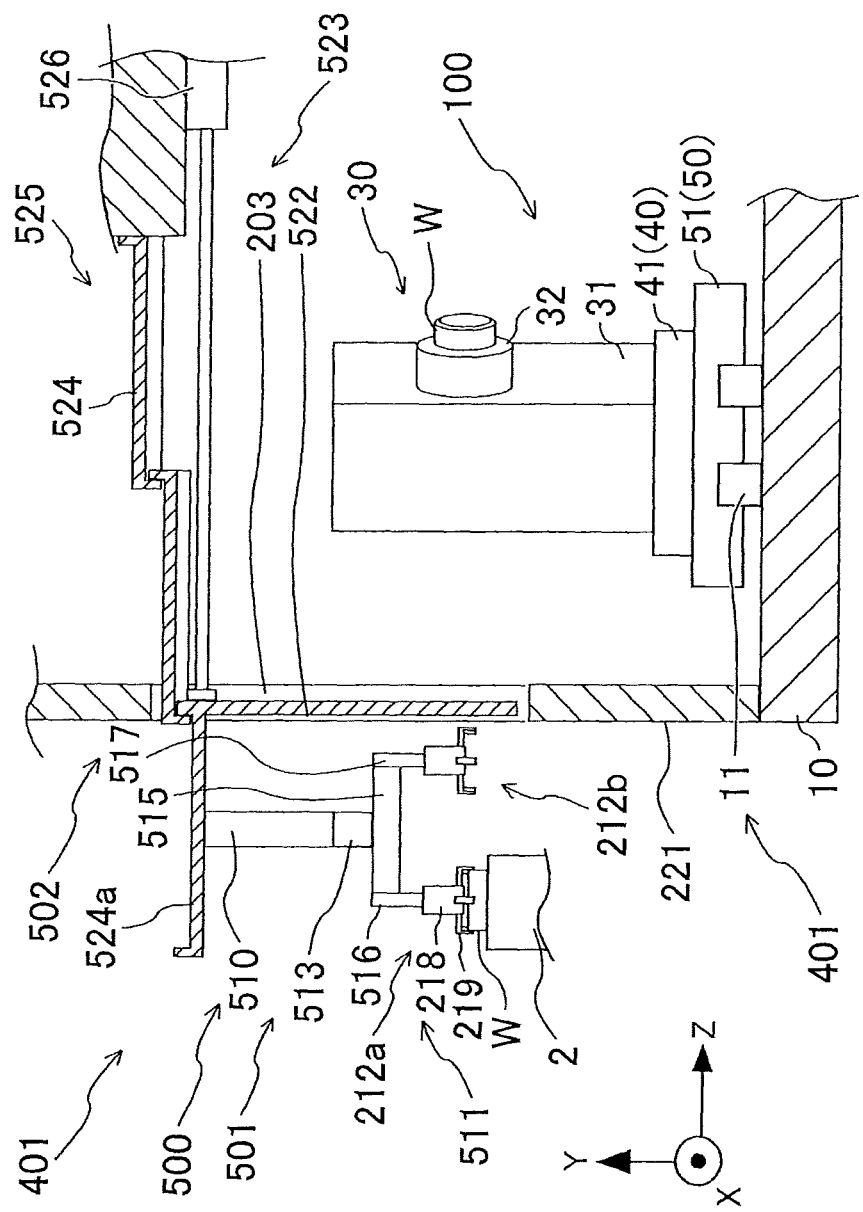
FIG. 13A is a schematic diagram of a machine tool according to a second embodiment of the invention, illustrating a workpiece replacing apparatus whose arm device is located in an extra-machine space.

As illustrated in FIG. 13A, the workpiece replacing apparatus 500 according to the second embodiment includes the arm device 501 and a housing 502. The housing 502 includes the secured cover 221, the movable cover 522, and a telescopic cover 523. The telescopic cover 523 includes a telescopic element 525 and a telescopic driver 526. The telescopic element 525 includes a plurality of cover pieces 524.

The telescopic cover 523 is disposed in an intra-machine space inside a machine tool 401. The telescopic element 525 is extendable and contractible in the Z-axis direction. The cover pieces 524 include a projectable cover piece 524a. The telescopic driver 526 is an actuator that provides a driving force to move the projectable cover piece 524a in the Z-axis direction. Extending the telescopic element 525 in the Z-axis direction moves the projectable cover piece 524a beyond an opening 203 such that the projectable cover piece 524a projects into an extra-machine space. The arm device 501 and the movable cover 522 are disposed on the projectable cover piece 524a.

The arm device 501 includes an arm body 511, a first gripper 212a, a second gripper 212b, an arm turning driver 513, a first gripper turning driver 214a, and a second gripper turning driver 214b. The arm body 511 includes an arm base 515, a first arm 516, a second arm 517, and an arm support 510.

The arm support 510 extends downward from the projectable cover piece 524a. The arm support 510 supports the arm base 515 such that the arm base 515 is rotatable relative to the arm support 510. The arm turning driver 513 provides a driving force to rotate the arm base 515 relative to the arm support 510. The arm device 501 rotates the arm base 515 so as to turn the first arm 516 and the second arm 517. The movable cover 522 is located inward of the arm support 510. The movable cover 522 is a plate extending from the projectable cover piece 524a. The movable cover 522 is able to close the opening 203.

The workpiece replacing apparatus 500 is configured to extend the telescopic element 525 of the telescopic cover 523 such that the movable cover 522 overlaps with the opening 203 in the Z-axis direction, thus closing the opening 203. In this state, the arm body 511 is located in the extra-machine space outside the machine tool 401. This enables the machine tool 401 to deliver a workpiece W to a conveyor 2 by the workpiece replacing apparatus 500 concurrently with machining of another workpiece W by a machining apparatus 100. Consequently, the machine tool 401 is able to reduce cycle time.

Operations of the workpiece replacing apparatus 500 will be described below. The arm support 510 and the movable cover 522 of the workpiece replacing apparatus 500 are both integral with the projectable cover piece 524a. The arm support 510 and the movable cover 522 thus slide in the Z-axis direction in conjunction with the extension and contraction of the telescopic element 525.

In delivering the workpiece W into the intra-machine space from the extra-machine space by the arm device 501, the workpiece replacing apparatus 500 moves the projectable cover piece 524a into the intra-machine space so as to contract the telescopic element 525. This moves the arm device 501 to the intra-machine space. During this operation, the movable cover 522 moves into the intra-machine space in conjunction with movement of the arm body 511. In delivering the workpiece W to the extra-machine space from the intra-machine space by the arm device 501, the workpiece replacing apparatus 500 moves the projectable cover piece 524a to the extra-machine space so as to extend the telescopic element 525. This moves the arm device 501 to the extra-machine space and moves the movable cover 522 to the opening 203 in conjunction with movement of the arm body 511.

The workpiece replacing apparatus 500 is thus able to open and close the opening 203 with the movable cover 522 concurrently with delivery of the workpiece W into and out of the machine tool 401 by the arm device 501. Accordingly, the time required for replacement of the workpiece W performed by the workpiece replacing apparatus 500 is shorter than when delivery of the workpiece W into and out of the machine tool 401 by the arm device 501 starts after completion of opening and closing of the opening 203 with the movable cover 522. Consequently, the machine tool 401 is able to reduce cycle time.

The arm body 511 and the movable cover 522 of the workpiece replacing apparatus 500 move together in the Z-axis direction. The distance between the arm device 501 and the movable cover 522 is thus maintained constant. Accordingly, the workpiece replacing apparatus 500 is able to reliably prevent the workpiece W delivered by the arm device 501 and the movable cover 522 from interfering with each other.

Although the embodiments of the invention have been described thus far, the invention is not limited in any way to the embodiments described above. It will be readily apparent to those skilled in the art that various changes and modifications may be made without departing from the spirit and scope of the invention. Numerical values and shapes indicated in the above-described embodiments are provided by way of example. The invention is not limited to any particular numerical values or shapes. In one example, angles, such as the angle at the circumference of the curved plate 280, are set at optimal angles in accordance with, for example, the dimensions of the workpiece W, the first gripper 212a, and the second gripper 212b, other components disposed adjacent to a region where the arm body 211 is to be turned, the dimensions of these components, the time required for replacement of the target workpiece W, and/or the time during which the workpiece W is to be machined.

The above embodiments have been described based on the assumption that the movable cover 222 (or the movable cover 522) is integral with the arm body 211 (or the arm body 511). The invention, however, is not limited to this arrangement. In one example, the movable cover 222 (or the movable cover 522) may be in engagement with the arm body 211 (or the arm body 511) such that the movable cover 222 (or the movable cover 522) is operable in conjunction with movement of the arm body 211 (or the arm body 511) during turning of the arm body 211 (or the arm body 511) through a portion of the region where the arm body 211 (or the arm body 511) is turnable.

The above embodiments have been described on the assumption that the machining apparatus 100 includes the workpiece turner 50 to turn the workpiece W around the B axis parallel or substantially parallel to the Y axis. The machining apparatus 100, however, does not necessarily have to include the workpiece turner 50. Alternatively, the machining apparatus 100 may include, instead of the workpiece turner 50, a tilter that swings around its axis perpendicular or substantially perpendicular to the C axis. The spindle 32 may be mounted on the tilter. In this case, the arm device 201 (or the arm device 501) may, when necessary, turn the first gripper 212a or the second gripper 212b so as to change the position of the workpiece W in delivering the workpiece W to the spindle 32. The workpiece replacing apparatus 200 (or the workpiece replacing apparatus 500) is thus able to deliver the workpiece W to various machining apparatuses, resulting in increased versatility.

The above embodiments have been described on the assumption that the arm body 211 (or the arm body 511) includes two arms (i.e., the first and second arms 216 and 217 or the first and second arms 516 and 517). Alternatively, the invention may be applicable to an arm device whose arm body is provided with a single arm. Also in this case, the workpiece replacing apparatus 200 (or the workpiece replacing apparatus 500) is able to reduce the time required for replacement of the workpiece W by carrying out opening and closing operation of the movable cover 222 (or the movable cover 522) in conjunction with operation of the arm device.

What is claimed is:

1. A workpiece replacing apparatus to deliver a workpiece into an intra-machine space enclosed inside a housing of a machine tool from an extra-machine space outside the housing of the machine tool and to deliver the workpiece machined by the machine tool to the extra-machine space from the intra-machine space, the workpiece replacing apparatus comprising:
    a secured cover comprising a portion of the housing and secured to a securing member of the machine tool, the secured cover defining a partition between the intra-machine space and the extra-machine space, the secured cover having a wall with an inner wall surface facing the intra-machine space and with an outer wall surface facing the extra-machine space, the wall being provided with a cover opening bridging the inner wall surface and the outer wall surface;
    an arm device to deliver the workpiece between the intra-machine space and the extra-machine space through the cover opening; and
    a movable cover comprising another portion of the housing and integral with the arm device or in engagement with the arm device, the movable cover being turnable relative to the secured cover about an axis extending parallel to either one of: (i) a portion of the inner wall surface adjoining the cover opening, and (ii) a portion of the outer wall surface adjoining the cover opening, such that the movable cover is operable in conjunction with operation of the arm device, the movable cover being configured to close the cover opening with the arm device located in the extra-machine space,
    wherein said movable cover includes a curved plate comprising an arc centered on said axis and disposed centrally in a turning region where the movable cover turns, the curved plate having a curvature defined around a turning center of the movable cover, and said movable cover includes an extended plate extending radially outward from a circumferential end of the curved plate.

2. The workpiece replacing apparatus according to claim 1, wherein
    the arm device includes
        an arm base turnable about said axis relative to the secured cover,
        a first arm disposed on the arm base, the first arm being configured to deliver the workpiece, and
        a second arm disposed on the arm base, the second arm being configured to deliver the machined workpiece, wherein
    the workpiece replacing apparatus further comprises a turning driver to turn the movable cover relative to the secured cover and to turn the arm base relative to the secured cover.

3. The workpiece replacing apparatus according to claim 2, wherein
    the secured cover includes
        a secured cover body comprising said wall and having a flat plate shape, the secured cover body wall being provided with a main opening corresponding to the cover opening, and
        a projecting cover disposed on an edge of the main opening of the secured cover body wall, the projecting cover projecting to the extra-machine space from the secured cover body wall,
    states of the arm device include a first state where the first arm receives the workpiece in the extra-machine space, and
        a second state where the second arm passes off the machined workpiece, in the extra-machine space, locations of the first and second arms of the arm device in the first state are different from locations of the first and second arms, respectively, of the arm device in the second state, with the arm device placed in at least one of the first state and the second state, a portion of the movable cover is located outward of the secured cover body wall, and the projecting cover closes a space between the main opening and the movable cover when the portion of the movable cover is located outward of the secured cover body wall.

4. The workpiece replacing apparatus according to claim 1, wherein the arm device includes an arm body movable in conjunction with movement of the movable cover, and a gripper supported by the arm body such that the gripper is turnable, the gripper being configured to grip the workpiece.

5. A machine tool comprising:

the workpiece replacing apparatus according to claim 1;

a workpiece retainer disposed inward of the secured cover, the workpiece retainer being configured to retain the workpiece during machining of the workpiece;

a tool retainer disposed inward of the secured cover, the tool retainer being configured to retain a machining tool for use in machining of the workpiece retained by the workpiece retainer; and a transporter to move the workpiece retainer relative to the tool retainer for machining of the workpiece and to move the workpiece retainer relative to the arm device for delivery of the workpiece between the workpiece retainer and the arm device.

6. The workpiece replacing apparatus according to claim 1, wherein the arm device is turnable about said axis to deliver the workpiece between the intra-machine space and the extra-machine space through the cover opening.

* * * * *